United States Patent
Ha et al.

(10) Patent No.: US 7,045,988 B2
(45) Date of Patent: May 16, 2006

(54) SENSORLESS CONTROLLER OF AC MOTOR AND CONTROL METHOD

(75) Inventors: Jung-Ik Ha, Fukuoka (JP); Kozo Ide, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/509,957

(22) PCT Filed: Mar. 26, 2003

(86) PCT No.: PCT/JP03/03741

§ 371 (c)(1),
(2), (4) Date: Oct. 4, 2004

(87) PCT Pub. No.: WO03/084050

PCT Pub. Date: Oct. 9, 2003

(65) Prior Publication Data

US 2005/0146306 A1 Jul. 7, 2005

(30) Foreign Application Priority Data

Apr. 2, 2002 (JP) .............................. 2002-100259

(51) Int. Cl.
*H02P 23/00* (2006.01)
*H02P 25/00* (2006.01)
*H02P 27/00* (2006.01)

(52) U.S. Cl. ...................... 318/807; 318/808; 318/810; 318/812

(58) Field of Classification Search ................. 318/807

See application file for complete search history.

(56) References Cited

U.S. PATENT DOCUMENTS

| 5,334,923 | A | * | 8/1994 | Lorenz et al. | ............... | 318/805 |
| 5,559,419 | A | * | 9/1996 | Jansen et al. | ............... | 318/808 |
| 5,565,752 | A | * | 10/1996 | Jansen et al. | ............... | 318/807 |
| 5,585,709 | A | * | 12/1996 | Jansen et al. | ............... | 318/807 |
| 5,880,550 | A | * | 3/1999 | Fukao et al. | ................. | 310/179 |
| 6,069,467 | A | * | 5/2000 | Jansen | ......................... | 318/802 |
| 6,184,638 | B1 | * | 2/2001 | Kinpara | ....................... | 318/432 |
| 6,429,616 | B1 | * | 8/2002 | Myers et al. | ............... | 318/459 |
| 6,639,380 | B1 | * | 10/2003 | Sul et al. | ..................... | 318/727 |
| 6,703,809 | B1 | * | 3/2004 | Royak et al. | ............... | 318/727 |

FOREIGN PATENT DOCUMENTS

| JP | 9-191698 A | 7/1997 |
| JP | 2000-350489 A | 12/2000 |
| JP | 2002-51580 A | 2/2002 |

* cited by examiner

*Primary Examiner*—Marlon T. Fletcher
*Assistant Examiner*—Renata McCloud
(74) *Attorney, Agent, or Firm*—Sughrue Mion, PLLC

(57) ABSTRACT

A speed control apparatus having a high frequency generator for superposing a high frequency signal on an estimated magnetic flux axis. A high frequency component extractor extracts an error signal of a magnetic flux position from a voltage or current detection signal having the same frequency component as a frequency component of the high frequency signal. A magnetic flux observer estimates a magnitude and a position of a magnetic flux. A first adaptive regulator adaptively regulates an error signal on a high frequency superposing side. A second adaptive regulator adaptively regulates an error signal on a magnetic flux observer side. A hybrid device switches the first adaptive regulator at a very low speed, the first and second adaptive regulators at a low speed and the second adaptive regulator at a high speed. A speed estimator estimates a speed from an output of the hybrid device.

36 Claims, 17 Drawing Sheets

SENSORLESS CONTROLLER OF AC MOTOR AND CONTROL METHOD

TECHNICAL FIELD

The present invention relates to a sensorless control method for implementing stable torque, speed and position controls within all driving ranges including a region having a zero speed and a zero output frequency without using the position and speed sensors of an AC motor such as a synchronous motor or an induction motor, and a control apparatus thereof.

BACKGROUND ART

In an environment in which a speed sensor cannot be attached or in order to reduce the cost of a control system, conventionally, a speed sensorless control has variously been used. At present, a V/F control is employed in uses in which a speed responsiveness is not required, while a sensorless vector control is employed in uses in which the high speed responsiveness is required. The sensorless vector control serves to estimate a speed without using the position and speed sensors and to implement torque and speed controls in the same manner as a control having a sensor. A method for estimating the speed of a synchronous motor which has mainly been employed utilizes an induction voltage generated corresponding to a rotation (an induction voltage method). There has been a method using a state observer in addition to the induction voltage method "Lang, U.S. Pat. No. 5,296,793, issued Mar. 22, 1994". In the method, a phase voltage and a phase current in a synchronous motor are detected and are input to a state observer constituted by an expression model based on the electromechanical equation of the motor to estimate the phase angle of the rotor of the synchronous motor. Moreover, a sensorless control based on the voltage and current equation of a brushless DC motor has been reported in "Matsui et al., "Sensorless operation of brushless DC motor drives," Proc. IEEE International Conference on Industrial Electronics, Control, and Instrumentation, vol. 2, pp. 739–744, 1993". However, these methods are constituted by an electric motor model. Therefore, there is a problem in that a sensitivity to a fluctuation in an electric motor parameter is high so that a deterioration in a control is caused by a voltage error. For this reason, particularly, it becomes impossible to estimate a speed in a very low speed region, including a zero speed, under a low induction voltage.

There is a method utilizing the magnetic saliency of an electric motor when estimating the speed at a very low speed including the zero speed. A voltage or current signal having a frequency component other than the output frequency of the electric motor is applied to the electric motor, thereby observing a change in an inductance or an impedance of the stator winding through the magnetic saliency to detect a position and a speed.

As one method, there has been disclosed "Ogasawara et al., "Implementation and position control performance of a position sensorless IPM motor drive system based on magnetic saliency," IEEE Trans. Ind. Appl., vol. 34, pp. 806–812, July/August 1998.". In this method, an inductance is detected in a short sampling time by using a voltage signal. For this reason, there is a problem in that the method is apt to be influenced by a fluctuation in a parameter or an observed noise. As another method, there has been disclosed "Jansen et al., "Transducerless position and velocity estimation in induction and salient AC machines," IEEE Trans. Ind. Appl., vol. 31, pp. 240–247, March/April 1995." for observing the position of a magnetic flux by using a high frequency signal rotating synchronously with speed of the rotations of the electric motor. However, a dynamic characteristic is limited due to the high frequency signal rotating synchronously with speed of the rotations of the electric motor being used. As a method for superposing a high frequency on an induction motor to estimate a speed, furthermore, there has been disclosed "Ha et al., Sensorless field-orientation control of an induction machine by high-frequency signal injection," IEEE Trans. Ind. Appl., vol. 35, pp. 45–51, January/February 1999.". This method can also be applied to a synchronous motor. Examples of an application to a reluctance motor include "Ha et al., Position-controlled synchronous reluctance motor without any rotational," IEEE Trans. Ind. Appl., vol. 35, pp. 1393–1398, November/December 1999." and examples of an application to a permanent magnet internal embedded type electric motor include "Ha et al., Sensorless position control and initial position estimation of an interior permanent magnet," Proc. IEEE Industry. Applications Conference, 2001.".

This method serves to superpose a high frequency, thereby estimating the position of a magnetic flux from a primary voltage and a current in an electric motor. In this method, a signal to be superposed is superposed on a magnetic flux axis rotating synchronously with an output frequency and is different from a high frequency signal rotating synchronously with speed of the rotations of the electric motor described above, and a superposed frequency is independent of an inverter output frequency. It becomes possible to estimate the position of the magnetic flux by extracting a high frequency impedance generating a magnetic saliency. Since the high frequency is superposed on the magnetic flux axis, a torque ripple is comparatively lessened so that a noise is also reduced. According to the method, it is possible to implement torque, speed and position controls at a zero speed and a zero output frequency.

Moreover, examples of the estimation of the speed of an induction motor and a vector control method include "Schauder, U.S. Pat. No. 4,862,054, issued Aug. 29, 1989". In the example, two standard models based on the electric circuit equation of an electric motor are mounted. One of them is a voltage model based on the primary side equation of the electric motor and the other is a current model based on a secondary side equation. Each of the models is constituted in a rectangular coordinate system. The speed is adaptively estimated by using a PI controller in such a manner that a deviation between two magnetic fluxes calculated from the models is zero. Moreover, a method for adaptively estimating a speed by using a magnetic flux observer has been reported in "Kubota et al., "Speed Sensorless Field Oriented Control of Induction Motor with Rotor Resistance Adaptation," IEEE Trans. on Ind. Appl., Vol. 30, No. 5, pp. 1219–1224, September/October 1994,". In this document, there has been proposed a method for adaptively estimating a speed in order to set the vector product value of an output error between an observer and a system, corresponding to the torque error of the observer, and a magnetic flux estimation value to be zero, which is performed simultaneously with the estimation of a magnetic flux.

However, these methods are constituted by an electric motor model. For this reason, there is a problem in that a sensitivity to a fluctuation in an electric motor parameter is high so that a deterioration in a control is caused by a voltage error. In particular, they are apt to be unstable in a region having a zero speed and a zero output frequency. An investigation into the problems of the stability of a sensorless control has been reported in 'Harnefors, "Instability Phenomena and Remedies in Sensorless Indirect Field Oriented Control," IEEE Trans. on Power Elec., Vol. 15, No. 4, pp. 733–743, July, 2000' and 'Sugimoto et al., "A Consideration about Stability of Vector Controlled Induction Motor Systems Using Adaptive Secondary Flux Observer," Trans. of IEE Japan, Vol. 119–10, No. 10, pp. 1212–1222, 1999.'.

As one method for solving the problems of the sensorless control in the region having a zero speed and a zero output frequency, there has been proposed 'Sul et al., "Sensorless Field Orientation Control Method of an Induction Machine by High Frequency Signal Injection," U.S. Pat. No. 5,886, 498, issued Mar. 23, 1999.'. In the method, a high frequency is superposed to estimate the position of a secondary magnetic flux from a primary voltage and a current in an electric motor in the same manner as in case of the synchronous motor. A signal to be superposed is superposed on a magnetic flux axis rotating synchronously with an output frequency and a superposed frequency is independent of the output frequency. It is possible to estimate the position of the magnetic flux by extracting a high frequency impedance generating a saliency magnetically. The principle of the magnetic saliency has been investigated in 'Ha et al., "Physical understanding of high frequency injection method to sensorless drives of an induction machine," Proc. IEEE Industry Applications Conference, Vol. 3, pp. 1802–1808, 2000.", in which a physical phenomenon caused by a high frequency superposition has been explained through a finite element method, and furthermore, a stable sensor control method at a zero speed and a zero output frequency has been proposed. The magnetic saliency implies a property that an inductance is varied depending on the direction of a magnetic flux or the position of a rotor.

However, such a method also has the following problems. For one of the problems, a high frequency is superposed on a basic voltage. For this reason, the method cannot be used in a place in which a voltage is limited, that is, a control region is limited. For the other problem, the method is a magnetic flux position estimating method based on a high frequency model which is different from and approximates to an electric motor model on the basis of an induction voltage. Therefore, there is a problem in that a torque vibration element such as a voltage error or a noise is generated by the superposition of the high frequency.

Therefore, it is an object of the invention to provide a sensorless control apparatus and method of an AC motor to implement stable torque, speed and position controls within all driving ranges including a region having a zero speed and a zero output frequency without generating a torque vibration element such as a voltage error or a noise even if a high frequency is superposed.

DISCLOSURE OF THE INVENTION

In order to attain the object, a first aspect of the invention is directed to a sensorless control apparatus of an AC motor which separates a motor current into a magnetic flux component and a torque component based on an estimated magnetic flux position of a synchronous motor without using position and speed sensors and independently controls each of them, thereby implementing a high control performance of the synchronous motor, comprising a high frequency generator for superposing a high frequency signal on an estimated magnetic flux axis of the motor, a high frequency component extractor for extracting, from a voltage or current detection signal having the same frequency component as a frequency component of the high frequency signal, an error signal of the magnetic flux position obtained based on a magnetic saliency of a physical quantity of the motor in a high frequency region generated by a magnetic saturation caused by a main magnetic flux or a skin effect produced by a high frequency, a magnetic flux observer for estimating a magnitude and a position of a magnetic flux from a motor input voltage, a detection current and a speed estimation value, a first adaptive regulator for adaptively regulating an error signal of a magnetic flux position to be an output of the high frequency component extractor, a second adaptive regulator for adaptively regulating an error signal calculated from a magnetic flux estimation value and an error value of an output of the magnetic flux observer in the same observer, a hybrid device for switching the first adaptive regulator at a very low speed, the first and second adaptive regulators at a low speed and the second adaptive regulator at a high speed depending on the speed, and a speed estimator for generating a speed estimation value from an output value of the hybrid device.

Moreover, a second aspect of the invention is directed to the sensorless control apparatus of an AC motor according to the first aspect of the invention, further comprising a magnetic flux regulator for regulating a magnetic flux level, regulating a magnetic saliency of a physical quantity of the motor in a high frequency region and regulating an efficiency, an estimated error corrector for correcting an estimated error made in an estimated magnetic flux, an estimated rotor speed and an estimated rotor position, a magnetic flux position calculator for calculating a position of a magnetic flux from the magnetic flux estimated from the magnetic flux observer, a current controller for separating a detection current into a magnetic flux direction component and a torque component by using an estimated magnetic flux position, feeding back each of them and comparing the magnetic flux direction component with a current command value of the torque component, thereby carrying out a current control in such a manner that each deviation is set to be zero, a speed controller for comparing an estimated speed with a command speed to execute a speed control in such a manner that a deviation thereof is set to be zero, thereby outputting a torque command value or a current command value corresponding to a torque command, and an initial magnetic pole position estimator for estimating an initial magnetic pole position before starting.

Furthermore, a third aspect of the invention is characterized in that the high frequency generator includes a device for regulating a high frequency signal to be superposed depending on a rotating speed of a magnetic flux or a rotor speed.

Moreover, a fourth aspect of the invention is characterized in that the high frequency generator superposes a high frequency signal on a voltage command value.

Furthermore, a fifth aspect of the invention is characterized in that the high frequency generator superposes a high frequency signal on a current command value.

Moreover, a sixth aspect of the invention is characterized in that the magnetic flux observer has a function of removing the high frequency signal from a motor input voltage depending on an output frequency or a speed.

Furthermore, a seventh aspect of the invention is characterized in that an error signal of a magnetic flux position obtained in the high frequency component extractor is based on an impedance or an admittance in a high frequency region which is superposed.

Moreover, an eighth aspect of the invention is characterized in that the hybrid device has a function of removing an output of the second adaptive regulator in a very low speed region including a zero speed and has a function of removing an output of the first adaptive regulator in middle and high speed regions.

Furthermore, a ninth aspect of the invention is characterized in that the speed estimator adaptively estimates a speed in order to set an error signal to be an output value of the hybrid device to be zero.

Moreover, a tenth aspect of the invention is characterized in that the magnetic flux regulator regulates a magnetic flux level into a portion in which a characteristic of the motor, that is, a magnetic saliency of a physical quantity of the motor in a high frequency region can be maintained and a high efficiency can be obtained, and the estimated error corrector corrects an estimated magnetic flux, an estimated rotor speed and an estimated rotor position error which are generated when the magnetic saliency at the high frequency is reduced.

Furthermore, an eleventh aspect of the invention is characterized in that the current controller has a function of removing a superposed high frequency component from a current which is fed back when the high frequency signal to be superposed is a voltage and a response frequency of the controller is set to be higher than a superposed frequency component when the high frequency signal to be superposed is a current.

Moreover, a twelfth aspect of the invention is characterized in that the initial magnetic pole position estimator has a signal processing portion for extracting at least one frequency of harmonics which are nth power of 2 (N=−1, 1, 2, 3, . . . , n) of the superposed high frequency and serves to discriminate an N or S pole of a magnetic pole.

Furthermore, a thirteenth aspect of the invention is directed to a sensorless control apparatus of an AC motor which separates a motor current into a magnetic flux component and a torque component based on an estimated magnetic flux position of a synchronous motor without using position and speed sensors and independently controls each of them, thereby implementing a high control performance of the synchronous motor, comprising means for superposing a high frequency signal on an estimated magnetic flux axis of the motor, Moreover, a fourteenth aspect of the invention is directed to the sensorless control method of an AC motor according to the thirteenth aspect of the invention, further comprising means for regulating a magnetic flux in order to maintain a magnetic saliency of a physical quantity of the motor in a high frequency region and to hold a high efficiency, an estimated error corrector for correcting an estimated error made in an estimated magnetic flux, an estimated rotor speed and an estimated rotor position, means for calculating a position of a magnetic flux from a magnetic flux vector estimated from the magnetic flux observer, means for separating a detection current into a magnetic flux direction component and a torque component by using an estimated magnetic flux position, feeding back each of them and comparing the magnetic flux direction component with a current command value of the torque component, thereby carrying out a current control in such a manner that each deviation is set to be zero, means for comparing an estimated speed with a command speed to execute a speed control in such a manner that a deviation thereof is set to be zero, thereby outputting a torque command value or a current command value corresponding to a torque command, and initial magnetic pole estimating means for discriminating an N or S pole of a magnetic pole before starting.

Furthermore, a fifteenth aspect of the invention is characterized in that the means for switching the adaptive rule means depending on a speed has a function of removing an output signal of the second adaptive rule means in a very low speed region including a zero speed and a zero frequency and has a function of removing an output signal of the first adaptive rule means in middle and high speed regions.

Moreover, a sixteenth aspect of the invention is characterized in that the means for extracting an error signal of a magnetic flux position obtained based on a magnetic saliency of a physical quantity of the motor uses the physical quantity of the motor including a motor input voltage command value and a detection current or a detection voltage and the detection current.

Furthermore, a seventeenth aspect of the invention is characterized in that the means for superposing a high frequency has means for regulating a high frequency signal to be superposed depending on an output frequency or a speed.

Moreover, an eighteenth aspect of the invention is characterized in that the means for regulating a magnetic flux serves to regulate a magnitude of a magnetic flux in order to obtain a magnetic saliency of a physical quantity of the motor in such a manner that a magnetic flux position can be detected depending on a peculiar characteristic to the motor at a very low speed including a zero speed and a zero frequency and an error of a magnetic flux position which is made by a load is regulated in a magnetic flux position on which a high frequency is to be superposed, the regulating means carrying out a regulation through an estimated error and a stator (primary) current or a command current.

Furthermore, a nineteenth aspect of the invention is characterized in that the initial magnetic pole estimating means has a signal processing portion for extracting at least one frequency of harmonics which are nth power of 2 (N=−1, 1, 2, 3, . . . , n) of the superposed high frequency and serves to discriminate an N or S pole of a magnetic pole.

Moreover, a twentieth aspect of the invention is directed to a sensorless control apparatus of an AC motor which separates a motor current into a magnetic flux component and a torque component based on an estimation value of a magnetic flux position of an induction motor without using a speed sensor and independently controls each of them, thereby implementing a high control performance of the induction motor, comprising a high frequency generator for superposing a high frequency signal on an estimated magnetic flux axis of the motor, a high frequency component extractor for extracting, from a voltage or current detection signal having the same frequency component as a frequency component of the high frequency signal, an error signal of the magnetic flux position obtained based on a magnetic saliency of a physical quantity of the motor in a high frequency region generated by a magnetic saturation caused by a main magnetic flux or a skin effect produced by a high frequency, a magnetic flux observer for estimating a magnitude and a position of a magnetic flux from a motor input voltage, a detection current and a speed estimation value, a third adaptive regulator for adaptively regulating an error signal of a magnetic flux position to be an output of the high frequency component extractor, a fourth adaptive regulator for adaptively regulating an error signal calculated from a magnetic flux estimation value and an error value of an output of the magnetic flux observer in the same observer, a hybrid device for switching the third adaptive regulator at a very low speed, the third and fourth adaptive regulators at a low speed and the fourth adaptive regulator at a high speed depending on the speed, and a speed estimator for generating a speed estimation value from an output value of the hybrid device.

Furthermore, a twenty-first aspect of the invention is directed to the sensorless control apparatus of an AC motor according to the twentieth aspect of the invention, further comprising a magnetic flux regulator for regulating a magnetic flux command and a magnetic flux position on which a high frequency signal is to be superposed in order to adjust a magnetic saliency of a physical quantity of the motor in a high frequency region, a magnetic flux position calculator for calculating a position of a magnetic flux from the magnetic flux estimated from the magnetic flux observer, a current controller for separating a detection current into a magnetic flux direction component and a torque component by using the calculated magnetic flux position, feeding back each of them and comparing the magnetic flux direction component with a current command value of the torque component, thereby carrying out a current control in such a manner that each deviation is set to be zero, and a speed controller for comparing an estimated speed with a command speed to execute a speed control in such a manner that a deviation thereof is set to be zero, thereby outputting a torque command value or a current command value corresponding to a torque command.

Moreover, a twenty-second aspect of the invention is characterized in that the high frequency generator includes a device for regulating a high frequency signal to be superposed depending on an output frequency or a speed.

Furthermore, a twenty-third aspect of the invention is characterized in that the high frequency generator superposes a high frequency signal on a voltage command value.

Moreover, a twenty-fourth aspect of the invention is characterized in that the high frequency generator superposes a high frequency signal on a current command value.

Furthermore, a twenty-fifth aspect of the invention is characterized in that the magnetic flux observer has a function of removing the high frequency signal from a motor input voltage depending on an output frequency or a speed.

Moreover, a twenty-sixth aspect of the invention is characterized in that an error signal of a magnetic flux position obtained in the high frequency component extractor is based on an impedance or an admittance in a high frequency region which is superposed.

Furthermore, a twenty-seventh aspect of the invention is characterized in that the hybrid device has a function of removing an output of the fourth adaptive regulator in a very low speed region including a zero speed and a zero frequency, and has a function of removing an output of the third adaptive regulator in middle and high speed regions.

Moreover, a twenty-eighth aspect of the invention is characterized in that the speed estimator adaptively estimates a speed in order to set an error signal to be an output value of the hybrid device to be zero.

Furthermore, a twenty-ninth aspect of the invention is characterized in that the magnetic flux regulator has a function of regulating a magnitude of a magnetic flux in order to obtain a magnetic saliency of a physical quantity of the motor in such a manner that a magnetic flux position can be detected depending on a peculiar characteristic to the motor and a function of regulating an error of a magnetic flux position which is made by a load in a magnetic flux position on which a high frequency is to be superposed.

Moreover, a thirtieth aspect of the invention is characterized in that the current controller has a function of removing a superposed frequency component from a current fed back when the high frequency signal to be superposed is a voltage, and a response frequency of the controller is set to be higher than the superposed frequency component when the high frequency signal to be superposed is a current.

Furthermore, a thirty-first aspect of the invention is directed to a sensorless control method of an AC motor which separates a motor current into a magnetic flux component and a torque component based on an estimation value of a magnetic flux position of an induction motor without using a speed sensor and independently controls each of them, thereby implementing a high control performance of the induction motor, comprising means for superposing a high frequency signal on an estimated magnetic flux axis of the motor, means for extracting, from a voltage or current detection signal having the same frequency component as a frequency component of the high frequency signal, an error signal of the magnetic flux position obtained based on a magnetic saliency of a physical quantity of the motor in a high frequency region generated by a magnetic saturation caused by a main magnetic flux or a skin effect produced by a high frequency, means for estimating a magnitude and a position of a magnetic flux from a motor input voltage, a detection current and an estimated speed through a magnetic flux observer, third adaptive rule means for adaptively regulating an error signal of a magnetic flux position to be an output of the high frequency component extractor, fourth adaptive rule means for adaptively regulating an error signal calculated from a magnetic flux estimation value and an error value of an output of the magnetic flux observer in the same observer, means for switching the first and second adaptive rule means depending on a speed or an output frequency, and means for estimating a speed from an output signal of the adaptive rule means.

Moreover, a thirty-second aspect of the invention is directed to the sensorless control method of an AC motor according to the thirty-first aspect of the invention, further comprising means for regulating a magnetic flux in order to adjust a magnetic saliency of a physical quantity of the motor in a high frequency region, means for calculating a position of a magnetic flux from the magnetic flux estimated from the magnetic flux observer, means for separating a detection current into a magnetic flux direction component and a torque component by using the calculated magnetic flux position, feeding back each of them and comparing the magnetic flux direction component with a current command value of the torque component, thereby carrying out a current control in such a manner that each deviation is set to be zero, and means for comparing an estimated speed with a command speed to execute a speed control in such a manner that a deviation thereof is set to be zero, thereby outputting a torque command value or a current command value corresponding to a torque command.

Furthermore, a thirty-third aspect of the invention is characterized in that the means for switching the adaptive rule means has a function of removing an output signal of the fourth adaptive rule means in a very low speed region including a zero speed and a zero frequency and a function of removing an output signal of the third adaptive rule means in middle and high speed regions.

Moreover, a thirty-fourth aspect of the invention is characterized in that the means for extracting an error signal of a magnetic flux position obtained based on a magnetic saliency of a physical quantity of the motor and the means for estimating a magnitude and a position of a magnetic flux by a magnetic flux observer use the physical quantity of the motor including a motor input voltage command value and a detection current or a detection voltage and the detection current.

Furthermore, a thirty-fifth aspect of the invention is characterized in that the means for superposing a high frequency has means for regulating a high frequency signal to be superposed depending on an output frequency or a speed in the speed sensorless control according to the twelfth aspect of the invention.

Moreover, a thirty-sixth aspect of the invention is characterized in that the regulating means serves to regulate a magnitude of a magnetic flux in order to obtain a magnetic saliency of a physical quantity of the motor in such a manner that a magnetic flux position can be detected depending on a peculiar characteristic to the motor at a very low speed including a zero speed and a zero frequency and an error of a magnetic flux position which is made by a load is regulated in a magnetic flux position on which a high frequency is to be superposed, the regulating means depending on an estimated speed and a stator (primary) current or a command current.

Figure 1:
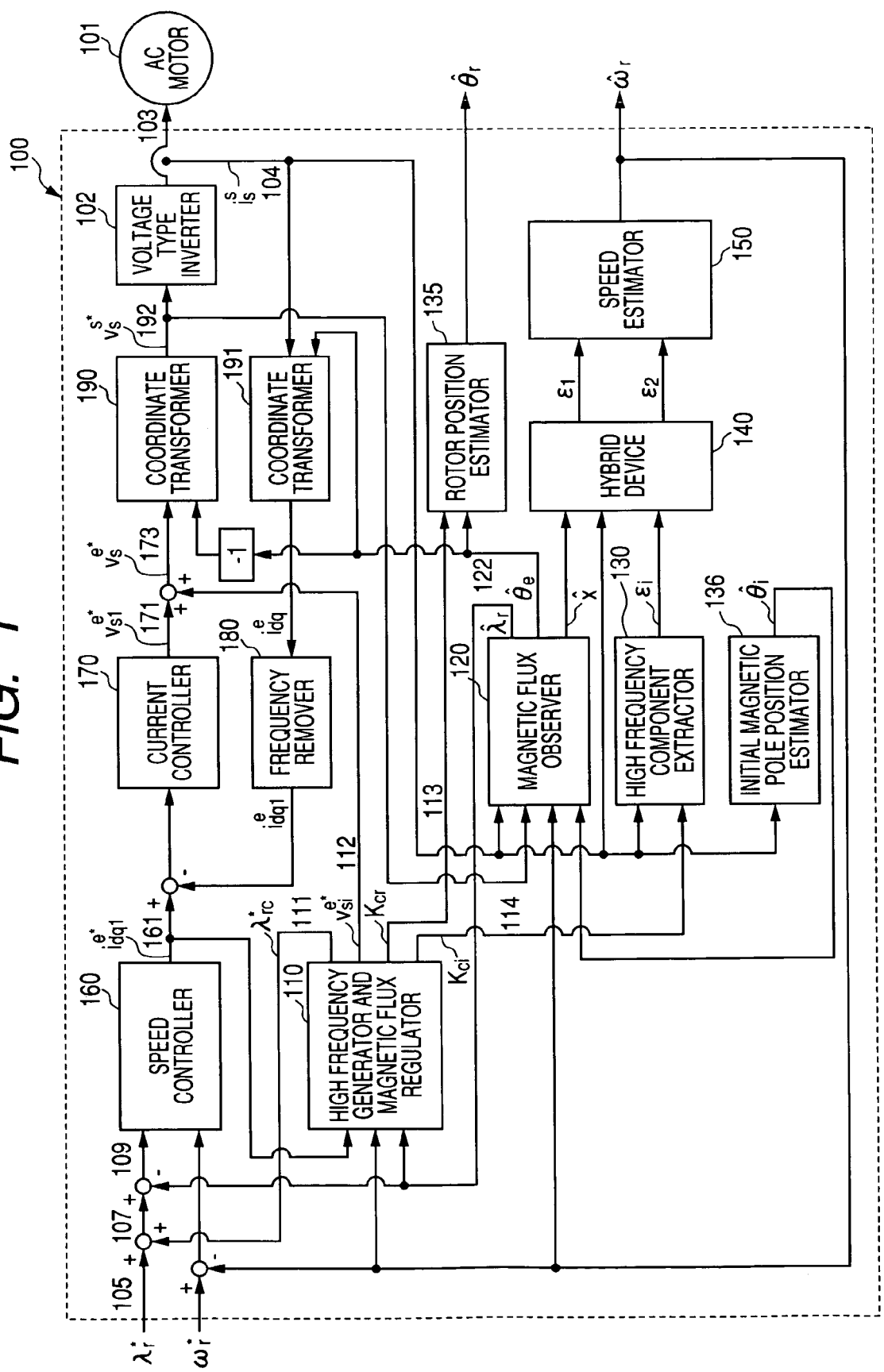
FIG. 1 is a diagram showing the structure of a sensorless control apparatus of an AC motor according to a first embodiment of the invention.

In the drawings, 100 and 800 denote a sensorless control apparatus, 101 and 801 denote an AC motor, 102 and 802 denote a voltage type inverter, 110 and 810 denote a high frequency generator and a magnetic flux regulator, 120 and 820 denote a magnetic flux observer, 130 and 830 denote a high frequency component extractor, 135 denotes a rotor position estimator, 136 and 836 denote an initial magnetic pole position estimator, 140 and 840 denote a hybrid device, 150 and 850 denote a speed estimator, 160 and 860 denote a speed controller, 170 and 870 denote a current controller, 180 denotes a superposed frequency remover, and 190, 191, 890 and 891 denote a coordinate transformer.

BEST MODE FOR CARRYING OUT THE INVENTION

Next, a first embodiment according to the invention will be described with reference to the drawings.

FIG. 1 is a diagram showing the structure of a sensorless control apparatus of an AC motor according to a first embodiment of the invention.

Figure 2:
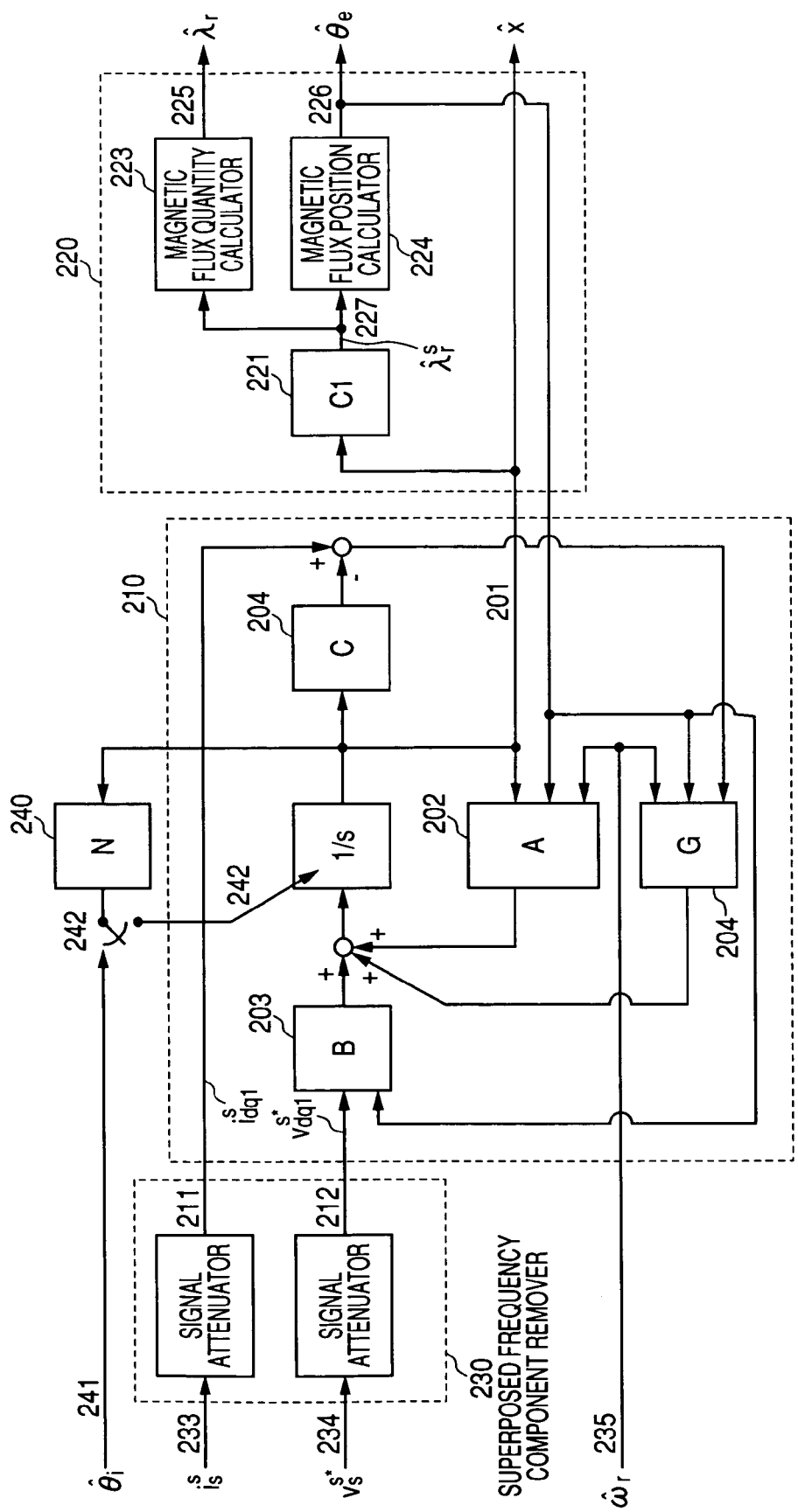
FIG. 2 is a diagram showing the details of a magnetic flux observer illustrated in FIG. 1.

FIG. 2 is a diagram showing the details of a magnetic flux observer illustrated in FIG. 1.

Figure 3:
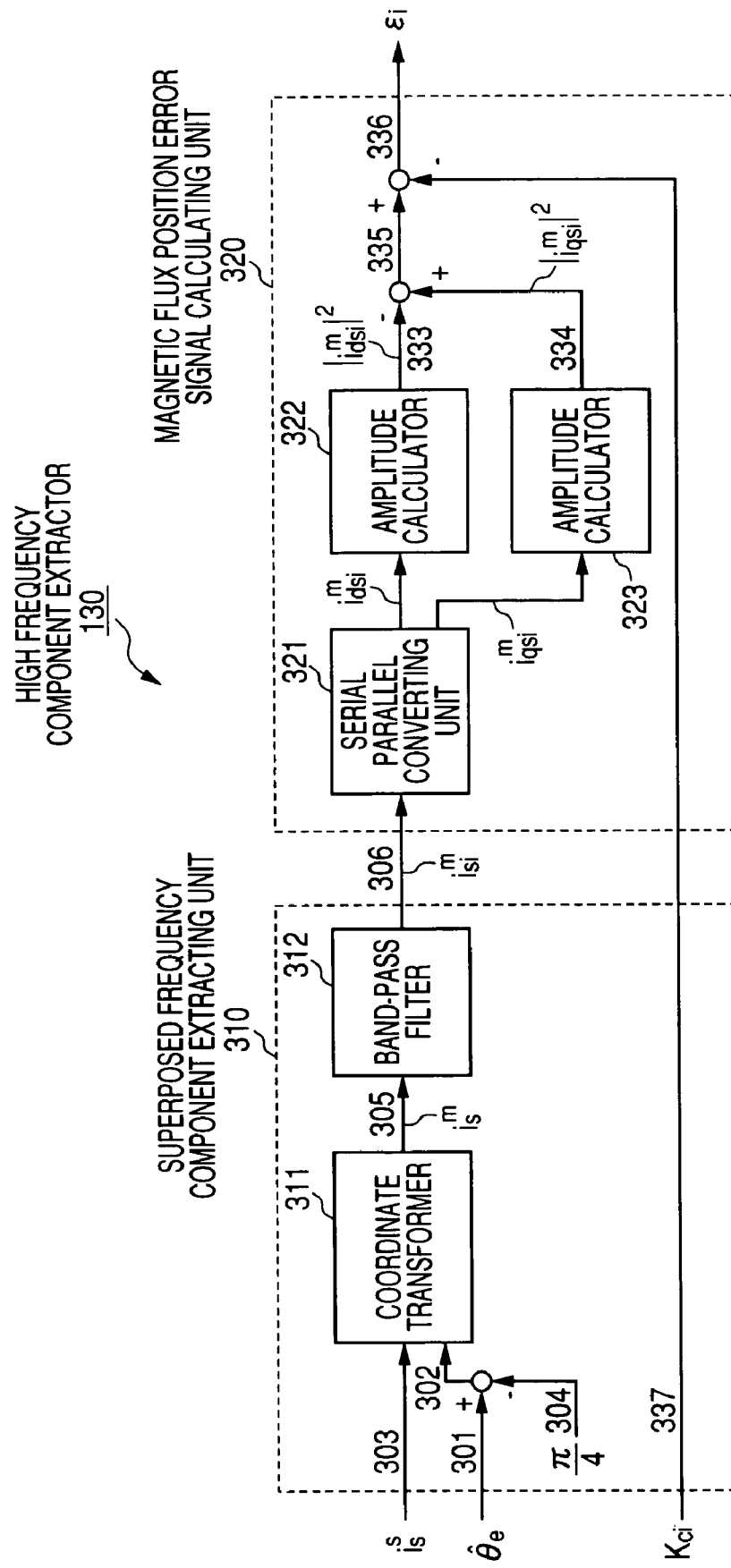
FIG. 3 is a diagram showing the details of a high frequency component extractor illustrated in FIG. 1.

FIG. 3 is a diagram showing the details of a high frequency component extractor illustrated in FIG. 1.

Figure 4:
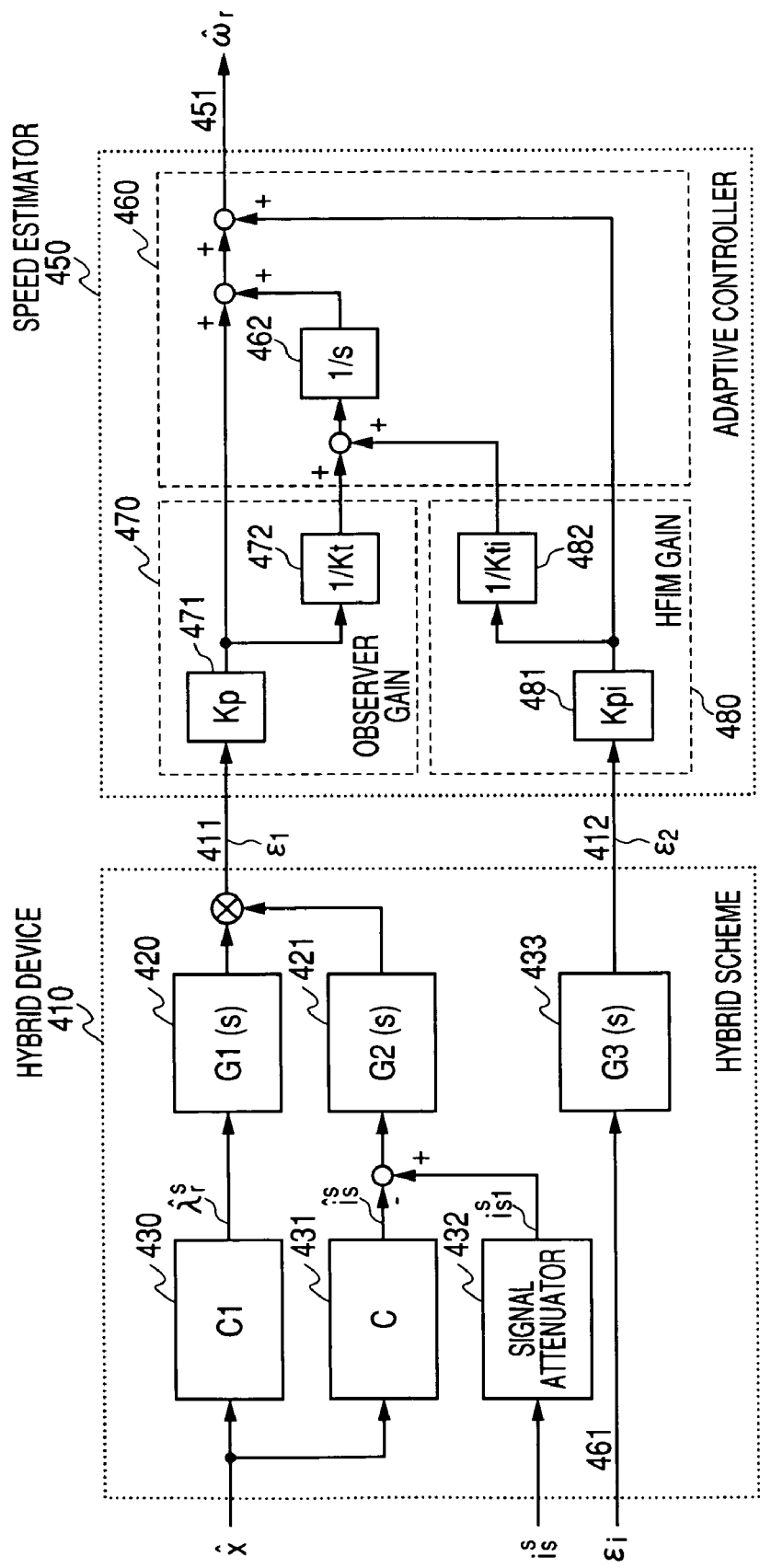
FIG. 4 is a diagram showing the details of a hybrid device and a speed estimator illustrated in FIG. 1.

FIG. 4 is a diagram showing the details of a hybrid device and a speed estimator illustrated in FIG. 1.

Figure 5:
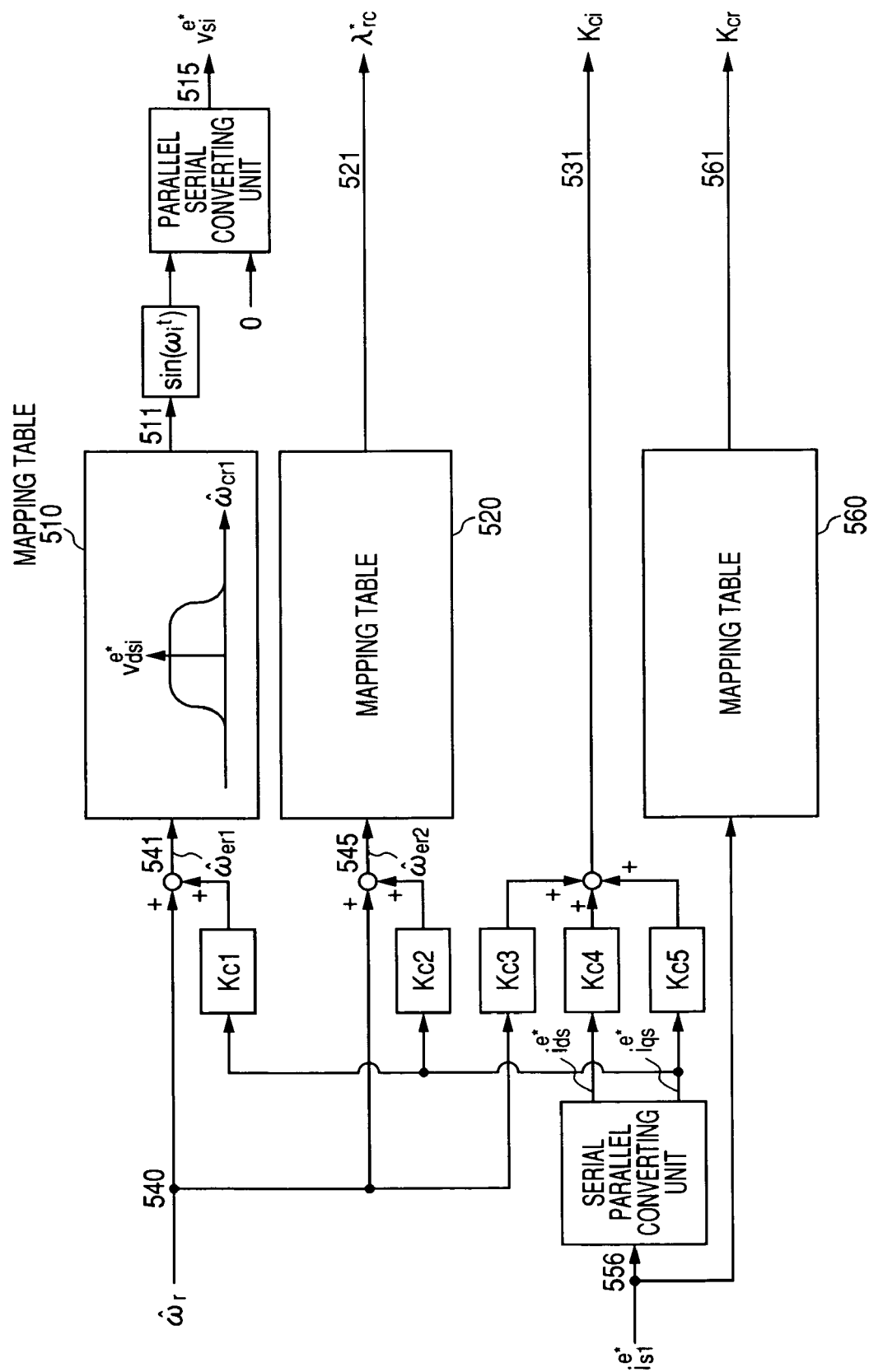
FIG. 5 is a diagram showing the details of a high frequency generator and a magnetic flux regulator illustrated in FIG. 1.

FIG. 5 is a diagram showing the details of a high frequency generator and a magnetic flux regulator illustrated in FIG. 1.

Figure 6:
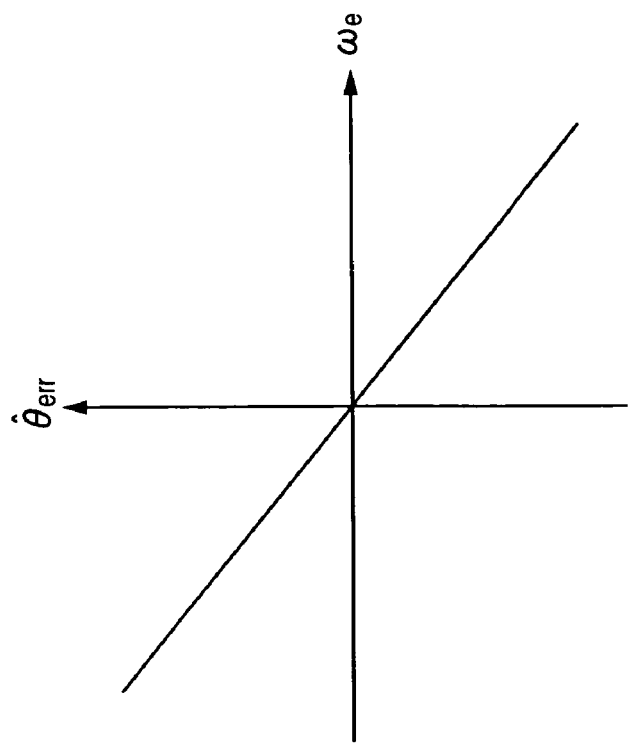
FIG. 6 is a diagram showing a relationship between an impedance and an operation frequency in the high frequency region of the AC motor illustrated in FIG. 1.

FIG. 6 is a diagram showing a relationship between an impedance and an operation frequency in the high frequency region of the AC motor illustrated in FIG. 1.

Figure 7:
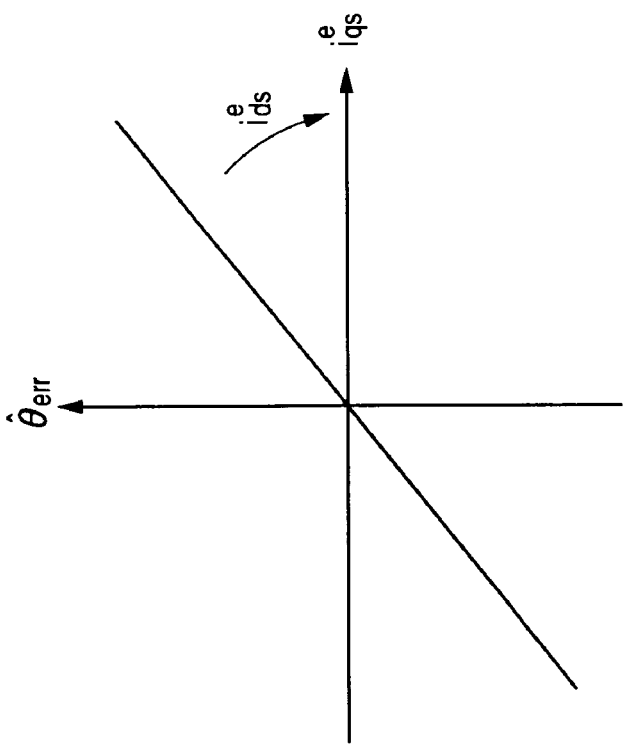
FIG. 7 is a diagram showing a relationship between the impedance and a load in the high frequency region of the AC motor illustrated in FIG. 1.

FIG. 7 is a diagram showing a relationship between the impedance and a load in the high frequency region of the AC motor illustrated in FIG. 1.

The sensorless control apparatus shown in FIG. 1 uses a method for superposing a high frequency voltage signal, and a method for superposing a high frequency current signal will be described below.

Moreover, a control block shown in FIG. 1 can be implemented by a digital operation in order to drive an electric motor by using a voltage type inverter 102. Furthermore, the same control block can also be implemented by using an analog circuit or using the analog circuit and a digital circuit together.

In FIG. 1, a sensorless control apparatus 100 has a high frequency generator and magnetic flux regulator 110 and the high frequency generator serves to superpose a high frequency signal on the estimated magnetic flux axis of an electric motor. The magnetic flux regulator regulates the magnetic saliency of the physical quantity of the electric motor in a high frequency region and regulates a magnetic flux command in order to compensate for a magnetic flux estimation error. Moreover, the error of a magnetic flux position which is made by a load is regulated in a magnetic flux position in which a high frequency is to be superposed.

A magnetic flux observer 120 estimates the magnitude and position of a magnetic flux from an electric motor input voltage, a detection current and a speed estimation value.

A high frequency component extractor 130 extracts, from a voltage or current detection signal having the same frequency component as the frequency component of a high frequency signal, the error signal of a magnetic flux position obtained based on the magnetic saliency of the physical quantity of an electric motor in a high frequency region generated by a magnetic saturation caused by a main magnetic flux or a skin effect produced by a high frequency. A rotor position estimator 135 serves to input a magnetic flux position 122 obtained by the magnetic flux observer 120 and a magnetic pole position corrector 113, and to estimate a rotor position. An initial magnetic pole position estimation value 136 serves to input a detection current and a superposed frequency command wi and to estimate an initial magnetic pole position in a stoppage state before starting.

A hybrid device 140 serves to switch an adaptive regulator for adaptively regulating the error signal of the magnetic flux position to be the output of the high frequency component extractor and an adaptive regulator for adaptively regulating an error signal calculated from a magnetic flux estimation value and the error value of the output of the magnetic flux observer in the same observer from a low speed to a high speed depending on the speed without a shock. A speed estimator 150 serves to adaptively estimate a speed in order to set, to be zero, the error signal to be the output value of the hybrid device 140.

Moreover, the sensorless control apparatus 100 has a magnetic flux and speed controller 160 and a current controller 170.

There is required a superposed frequency remover 180 for removing a superposed frequency component from a current fed back to the current controller 170. The device 180 for removing the superposed frequency component is constituted by a low-pass filter or a notch filter. Consequently, a voltage command value 171 to be the output of the current controller 170 does not include a superposed frequency component.

By using the estimated magnetic flux position, coordinate transformers 190 and 191 serve to execute a vector coordinate transformation as in the following equations (1) and (2), respectively.

$$v_s^{s*} = e^{j\theta e} v_s^{e*} \quad (1)$$

$$v_s^{e*} = e^{-j\theta e} V_s^{s*} \quad (2)$$

wherein $V_s^{s*}$ represents a voltage command vector in a static coordinate system (a U-phase reference of a phase voltage), and $V_s^{e*}$ represents a voltage command vector in a rotary coordinate system (which is rotated synchronously with an output frequency on an estimated magnetic flux axis reference).

The operation of each portion will be described below with reference to the respective drawings.

FIG. 2 shows the internal structure of the magnetic flux observer 120 in FIG. 1. The formula model of the synchronous motor in the static coordinate system can be expressed in the following manner.

$$\dot{x} = A(\omega_r, \theta_r)x + B(\theta_r)u \quad (3)$$

$$i_s^s = C_x \quad (4)$$

In the equations (3) and (4), $$x = [i_{ds}^s\, i_{qs}^s\, \lambda_{dr}^s\, \lambda_{qr}^s]^T,$$

$$A(\omega_r, \theta_r) = \begin{bmatrix} A1(\omega_r, \theta_r) & B1(\theta_r) \\ 0 & \omega_r J \end{bmatrix},$$

-continued $$B = \begin{bmatrix} B_i(\theta_r) \\ 0 \end{bmatrix},$$

$$u = v_s^s = [v_{ds}^s\, v_{qs}^s]^T,$$

$$\lambda_r = [\lambda_{dr}^s\, \lambda_{qr}^s]^T,$$

and a system matrix (expressed in A), an output matrix (expressed in C) and matrices I and J are as follows, respectively.

$$A_1(\omega_r, \theta_r) = L_1^{-1}(-R_s I - p L_1),$$

$$B(\theta_r) = L_1^{-1},$$

$$L^1 = \frac{1}{2}(L_d + L_q)I + \frac{1}{2}(L_d - L_q)\begin{bmatrix} \cos 2\theta_r & \sin 2\theta_r \\ \sin 2\theta_r & -\cos 2\theta_r \end{bmatrix}$$

$$C = [I\,0]$$

$$I = \begin{bmatrix} 1 & 0 \\ 0 & 1 \end{bmatrix}, J = \begin{bmatrix} 0 & -1 \\ 1 & 0 \end{bmatrix},$$

The state variables are as follows.

$i_{ds}^s$ = a d-axis component of a primary current in a static coordinate system, $i_{qs}^s$ = a q-axis component of the primary current in the static coordinate system, $\lambda_{dr}^s$ = a d-axis component of a secondary magnetic flux in the static coordinate system, $\lambda_{qr}^s$ = a q-axis component of the secondary magnetic flux in the static coordinate system, $v_{ds}^s$ = a d-axis component of a primary voltage in the static coordinate, and $v_{qs}^s$ = a q-axis component of the primary voltage in the static coordinate system, $\omega_r$ = rotor speed, and $\theta_r$ = rotor position.

An observer 210 for the equations (3) and (4) is constituted in the following manner.

$$\dot{\hat{x}} = A\hat{x} + Bv_s^s + G(\hat{i}_s^s - i_s^s)$$

$$\hat{i}_s^s = C\hat{x}$$

$$\hat{\lambda}_r^s = C_1\hat{x}$$

wherein the state variables are as follows.

$$\hat{x} = [\hat{i}_s^s\, \hat{\lambda}_r^s]^T$$

$$\hat{i}_s^s = [\hat{i}_{dr}^s\, \hat{i}_{qs}^s]^T$$

$$\hat{\lambda}_r^s = [\hat{\lambda}_{dr}^s\, \hat{\lambda}_{qr}^s]^T$$

Other matrices are as follows:

$C_1 = [0\ 1]$; and

G = observer gain matrix.

In the state observer 210, a superposed frequency is removed and output from a feedback signal 233 and an input signal 234 by a superposed frequency component remover 230. This is required for removing the influence of a high frequency superposing signal. An estimated magnetic flux 227 is converted into a magnetic flux quantity 225 and a phase angle 226 by means of a magnetic flux quantity calculator 223 and a magnetic flux position calculator 224.

An output 241 of the initial magnetic flux estimator represents a sign for determining an N pole or an S pole after the position of a magnetic pole is estimated into 0 or π before starting and serves to carry out a multiplication over the following matrix N, thereby correcting an initial magnetic flux.

$$N = \begin{bmatrix} I & 0 \\ 0 & -I \end{bmatrix}$$

FIG. 3 is a diagram showing the details of the high frequency component extractor 130 in FIG. 1. The high frequency component extractor serves to extract, from a voltage or current detection signal having the same frequency component as the frequency component of the superposed high frequency signal, the error signal of a magnetic flux position obtained based on the magnetic saliency of the physical quantity of an electric motor in a high frequency region generated by a magnetic saturation caused by a main magnetic flux or a skin effect produced by a high frequency. In the embodiment, the same error signal is extracted from the current detection signal. The high frequency component extractor is constituted by a superposed frequency component extracting unit 310 for extracting a superposed high frequency component from a detection voltage or current and a magnetic flux position error signal calculating unit 320 for calculating the error signal of a magnetic flux position.

In the case in which an estimated magnetic flux position 301 is not coincident with a true value, a high frequency current is generated on a q axis with a high frequency voltage superposed on a d axis of a rotary coordinate system. In order to estimate the magnetic flux position, accordingly, the high frequency signal is superposed on the estimated magnetic flux position 301. In the starting of the electric motor, an optional axis is assumed to be the estimated magnetic flux position 301. In order to detect the influence of the superposed high frequency, an orthogonal detection coordinate system 302 is put. The coordinate system is put in a π/4 radian lag phase from the estimated magnetic flux position 301. If the estimated magnetic flux position 301 is placed between an actual magnetic flux axis and an axis which is orthogonal thereto, a high frequency component detected by the detection coordinate system 302 has the magnetic saliency of a high frequency impedance. For this reason, a difference is made on a value over the reference axis (d axis) of the detection coordinate and the axis (q axis) which is orthogonal thereto. If it is assumed that an admittance at the superposed frequency is distributed in a bending shape and is symmetrical with respect to the actual magnetic flux axis, the magnitude of an admittance with a superposed frequency at an optional phase angle can be expressed in the following manner.

$$Y(\Delta\theta) = -Y_1 \cos(2\Delta\theta) + Y_2$$

$$\Delta\theta = \hat{\theta}_e - \theta_e$$

wherein $\hat{\theta}_e$ represents an estimated magnetic flux position and $\theta_e$ represents an actual magnetic flux position.

If a high frequency voltage having a frequency ωi and an amplitude Vdsi* is superposed on an estimated magnetic flux axis, a relationship between a voltage and a current in the detection coordinate system 302 can be expressed in the following manner.

$$|i_{dsi}^m| = \left[-Y_1 \cos\left(2\Delta\theta - \frac{\pi}{2}\right) + Y_2\right] \frac{v_{dsi}^*}{\sqrt{2}}$$

$$|i_{qsi}^m| = \left[-Y_1 \cos\left(2\Delta\theta + \frac{\pi}{2}\right) + Y_2\right] \frac{v_{qsi}^*}{\sqrt{2}}$$

wherein $i_{dsi}^m$ represents the superposed frequency component of a d-axis current in the detection coordinate system and $i_{qsi}^m$ represents the superposed frequency component of a q-axis current in the detection coordinate system.

In the invention, a primary current 303 is converted into the detection coordinate system by means of a coordinate converter 311. Only the superposed frequency component of a current 305 obtained by the conversion is extracted by means of a band-pass filter 312. The amplitude of a current signal 306 thus extracted is distributed into amplitude calculators 322 and 323 through a DEMUX (serial-parallel converting) unit 321 and square values thereof are obtained by the amplitude calculators 322 and 323, and values 333 and 334 are output respectively. An error signal corresponding to a difference between values on the q axis and the d axis of the square value of an admittance in the detection coordinate system is defined in the following manner.

$$\varepsilon_{i0} = |i_{qsi}^m|^2 - |i_{dsi}^m|^2 = 2Y_1 Y_2 v_{dsi}^{*2} \sin(2\Delta\theta) \quad (5)$$

The error signal is corrected through an output Kci 337 of a compensator in the following manner in order to compensate for an estimated error or to maintain a magnetic saliency.

$$\epsilon_i = \epsilon_{i0} - K_{ci} \quad (6)$$

The Kci 337 will be described with reference to the following FIG. 5.

FIG. 4 is an explanatory diagram showing the details of the hybrid device 140 (410 in FIG. 4) and the speed estimator 150 (450 in FIG. 4) in FIG. 1. An error signal ∈1 corresponding to a speed estimation error is constituted by a state estimation quantity through an observer in the following manner.

$$\epsilon_i = G_2(s)(i_{ds}^s - \hat{i}_{ds}^s) \cdot G_1(s)\lambda_{qr}^s - G_2(s)(i_{qs}^s - \hat{i}_{qs}^s) \cdot G_1(s)\lambda_{dr}^s$$

wherein G1(s) and G2(s) represent a transfer function for removing an input signal in a region having a zero speed and a zero frequency.

In middle and high speed regions, accurate information about a magnetic flux position cannot be obtained, due to a voltage limitation, from an error signal εi 412 calculated in the equations (5) and (6). For this reason, a signal is to be removed depending on a speed. Therefore, an error signal is newly generated from the error signal 412 calculated in the equation (5) by using a transfer function of G3(s) 433.

$$\epsilon_2 = G_3(s)\epsilon_i$$

wherein $G_3(s)$ represents a transfer function for removing an input signal in the middle and high speed regions.

The speed estimator 450 has a proportional integration (PI) regulator 460 and the gain of an error signal $\epsilon_1$ 411 is regulated to set an error signal $\epsilon_2$ 412 to be zero. The responsiveness of the error signal $\epsilon_1$ 411 and the error signal $\epsilon_2$ 412 and the regulated gain are different from each other. For this reason, the regulation can be separately carried out as in a gain 470 corresponding to an error signal $\epsilon_1$ (an error signal on an observer side) and a gain 480 corresponding to the error signal $\epsilon_2$ 412 (an error signal based on a high frequency superposition). The PI regulator 460 regulates the error signals to be zero, and at the same time, estimates a speed 451.

FIG. 5 illustrates the high frequency generator and magnetic flux regulator 110 in FIG. 1. The high frequency generator and magnetic flux regulator 110 outputs a high frequency signal $v_{si}^{e*}$ 515 to be superposed on the estimated magnetic flux axis, a magnetic flux command regulation value $\lambda_{rc}^*$ 521 for regulating the magnitude of a magnetic flux in order to obtain the magnetic saliency of the physical quantity of an electric motor in such a manner that a magnetic flux position can be detected on a load condition, and a regulation gain Kci 531 for regulating a magnetic flux position on which a high frequency is to be superposed.

An amplitude 511 of a high frequency signal is determined by a previously mapped table 510 on a condition 541 obtained in the following equation.

$$\hat{\omega}_{rc1} = \hat{\omega}_r + K_{c1} \cdot i_{qs}^{e*}$$

The magnetic flux command regulation value λrc* 521 is determined by a previously mapped table 520. The maximum value of a magnetic flux command regulation level is equivalent to a condition that the magnetic saliency of the physical quantity of an electric motor is maximized, and is based on a characteristic which is peculiar to the electric motor. The condition of the regulation is set to be a condition 545 which is determined in the following equation.

$$\hat{\omega}_{rc2} = \hat{\omega}_r + K_{c2} \cdot i_{qs}^{e*}$$

A method for detecting a magnetic flux position through a high frequency superposition is based on the characteristic of an impedance or admittance of the high frequency region of a synchronous motor. A condition that the saliency of the impedance of the high frequency region is shown in FIGS. 6 and 7. FIG. 6 shows that an angle indicative of the degree of the saliency of the impedance is delayed in a phase based on the inductance characteristic of the synchronous motor when an operation frequency is increased. FIG. 7 shows that the angle indicative of the degree of the saliency of the impedance is delayed in the phase due to the saturation of the primary leakage inductance of the synchronous motor when a load is increased (a q-axis current is increased). The regulation gain Kci 531 for correcting an angle error made by the phenomenon is determined in the following equation.

$$K_{ci} = K_{c3} \cdot \hat{\omega}_r + K_{c4} \cdot i_{ds}^{e*} + K_{c5} \cdot i_{qs}^{e*}$$

Herein, a magnetic flux position is different from a rotor position in some cases, and there is provided a table 560 for compensating for an error between the magnetic flux position and the rotor position based on the characteristic of the electric motor.

Next, a second embodiment according to the invention will be described with reference to the drawings.

Figure 8:
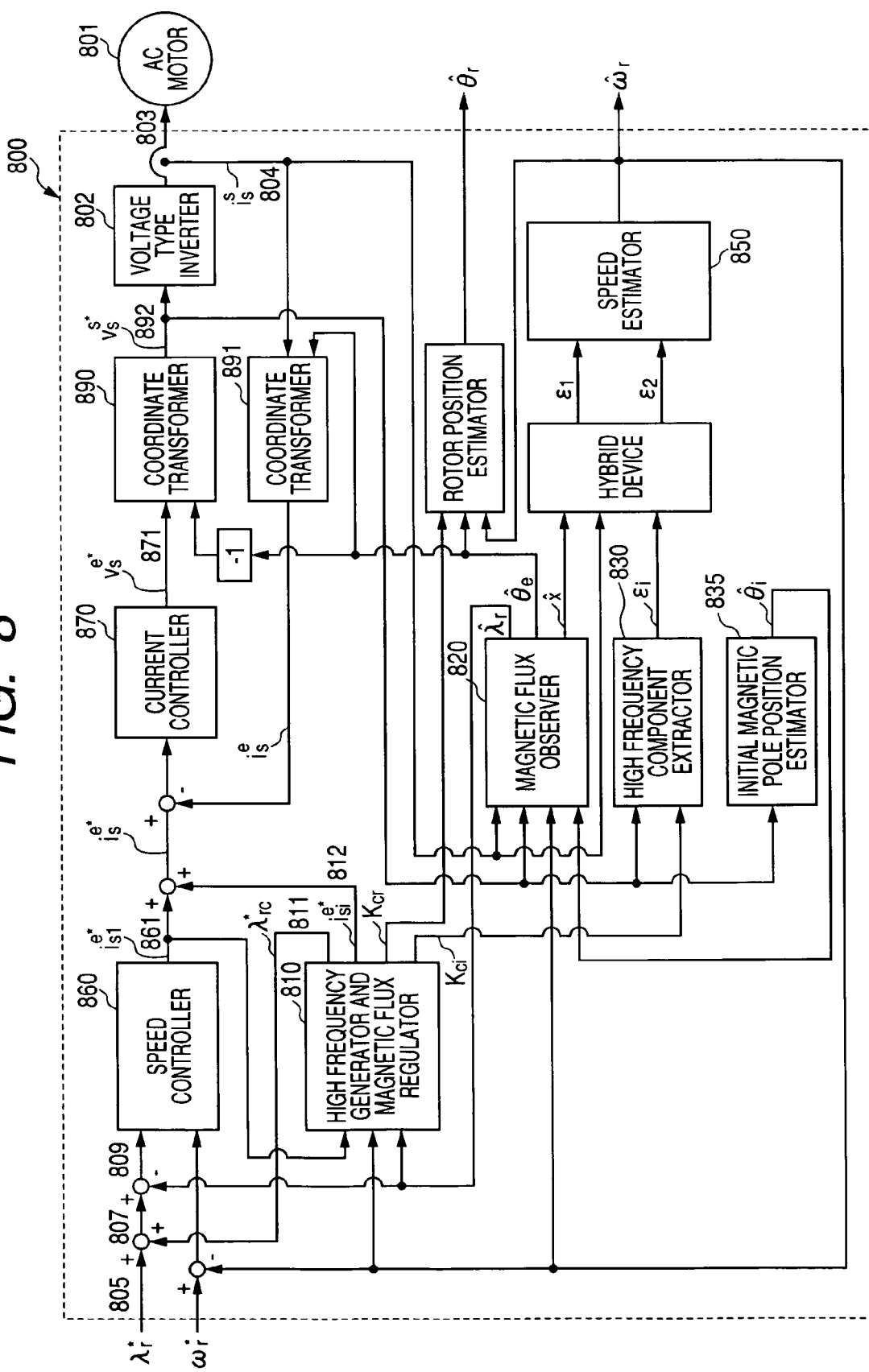
FIG. 8 is a diagram showing the structure of a sensorless control apparatus of an AC motor according to a second embodiment of the invention.

FIG. 8 is a diagram showing the structure of a sensorless control apparatus of an AC motor according to the second embodiment of the invention.

Figure 9:
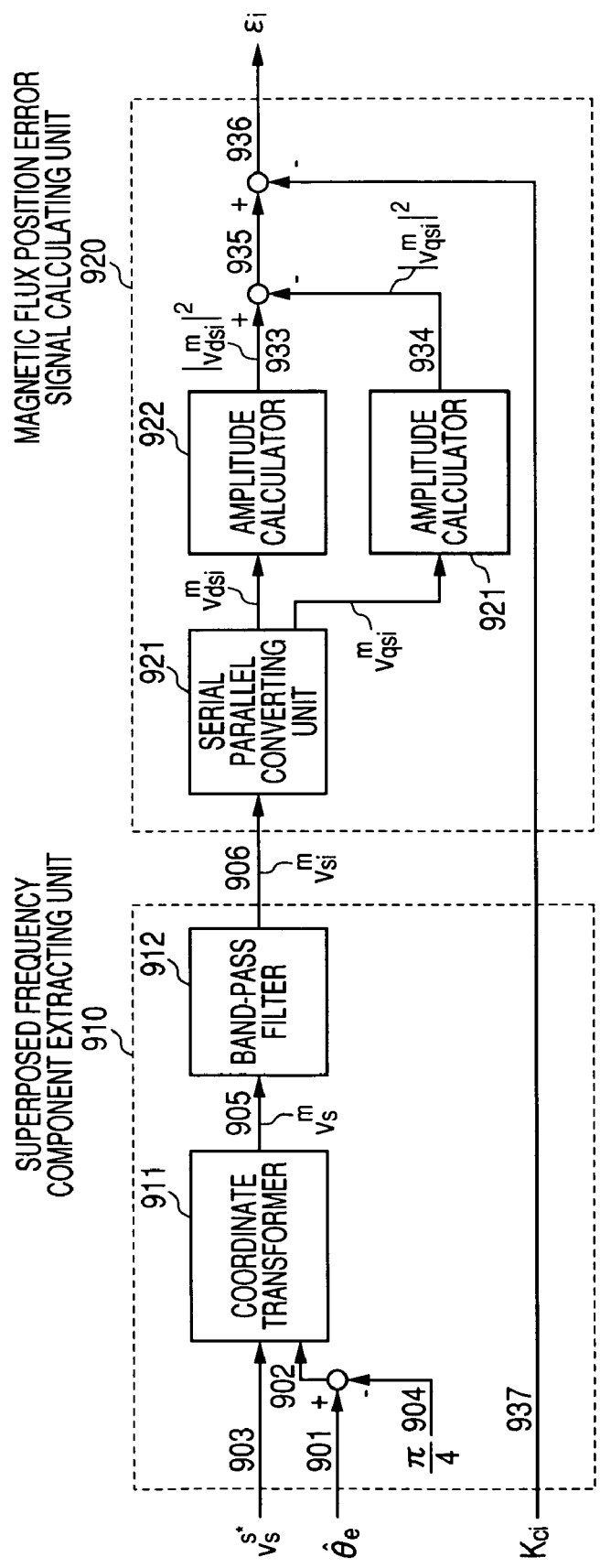
FIG. 9 is a diagram showing the details of a high frequency component extractor illustrated in FIG. 8.

FIG. 9 is a diagram showing the details of a high frequency component extractor illustrated in FIG. 8.

Figure 10:
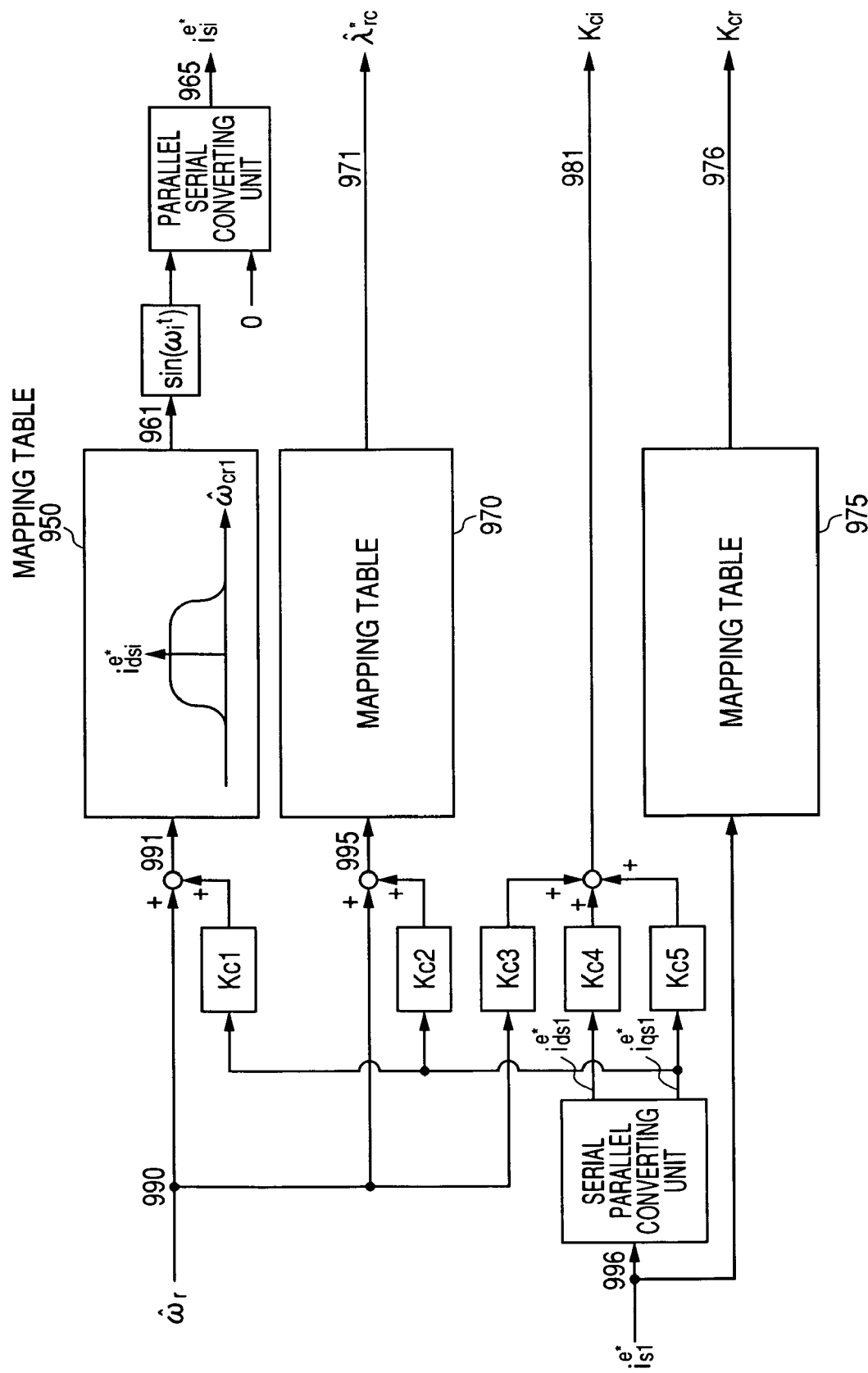
FIG. 10 is a diagram showing the details of a high frequency generator and a magnetic flux regulator illustrated in FIG. 8.

FIG. 10 is a diagram showing the details of a high frequency generator and a magnetic flux regulator illustrated in FIG. 8.

Figure 11:
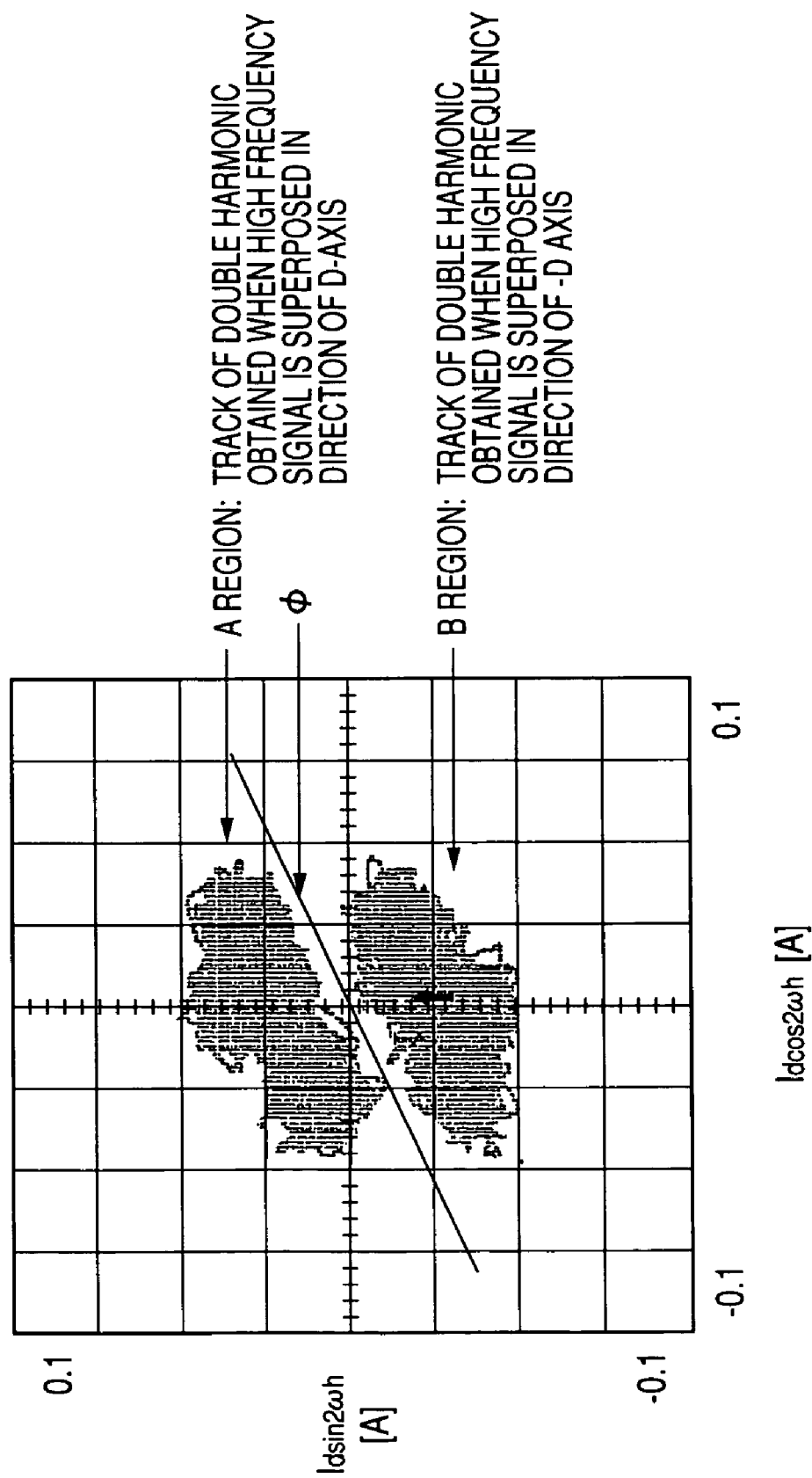
FIG. 11 is a chart showing the characteristic of a double frequency in the case in which a voltage high frequency is superposed in an initial magnetic pole estimator illustrated in FIG. 8.

FIG. 11 is a chart showing the characteristic of a double harmonic in the case in which a voltage high frequency is superposed in an initial magnetic pole estimator illustrated in FIG. 8.

Figure 12:
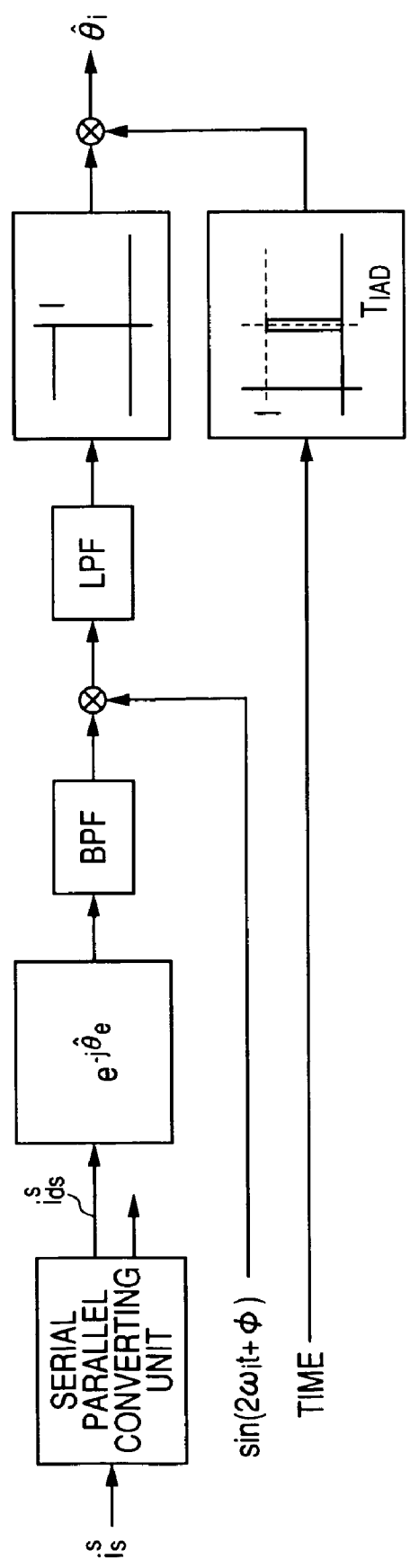
FIG. 12 is an explanatory diagram showing the initial magnetic pole estimator illustrated in FIG. 8.

FIG. 12 is an explanatory diagram showing the initial magnetic pole estimator illustrated in FIGS. 1 and 8.

FIG. 8 is a diagram showing the structure of a sensorless control apparatus of an AC motor according to the second embodiment of the invention, illustrating a method for superposing a high frequency current. While the method is similar to the method for superposing a high frequency voltage in FIG. 1, it is different therefrom in that a high frequency signal 812 is superposed on the input portion of a current controller 870 and a superposing signal remover (corresponding to 180 in FIG. 1) is erased from a detection current feedback portion. The repetitive description of other identical structures to those in FIG. 1 will be omitted.

Next, an operation will be described with reference to each of the drawings.

FIG. 9 illustrates a high frequency component extractor 830 in FIG. 8. Assuming that an impedance is distributed in a bending shape at a superposed frequency and is symmetrically with respect to an actual magnetic flux axis, an impedance with a superposed frequency at an optional phase angle can be expressed in the following manner.

$$Z(\Delta\theta) = Z_1 \cos(2\Delta\theta) + Z_2$$

If a high frequency current having a frequency ωi and an amplitude idsie* is superposed on an estimated magnetic flux axis, a relationship between a voltage and a current in a detection coordinate system 902 can be expressed in the following manner.

$$|v_{dsi}^m| = \left[Z_1 \cos\left(2\Delta\theta - \frac{\pi}{2}\right) + Z_2\right] \frac{i_{dsi}^{e*}}{\sqrt{2}}$$

$$|v_{qsi}^m| = \left[Z_1 \cos\left(2\Delta\theta + \frac{\pi}{2}\right) + Z_2\right] \frac{i_{qsi}^{e*}}{\sqrt{2}}$$

wherein $$v_{dsi}^m$$

represents the superposed frequency component of a d-axis voltage in the detection coordinate system and $v_{qsi}^m$ represents the superposed frequency component of a q-axis voltage in the detection coordinate system.

In the invention, a primary voltage 903 is converted into the detection coordinate system by means of a coordinate converter 911. Only the superposed frequency component of a voltage 905 obtained by the conversion is extracted by means of a band-pass filter 912. Square values 933 and 934 of the amplitude of a voltage signal 906 thus extracted are calculated in amplitude calculators 921 and 922. An error signal corresponding to a difference between values on the q axis and the d axis of the square value of an impedance in the detection coordinate system is defined in the following manner.

$$\varepsilon_{i0} = |v_{qsi}^m|^2 - |v_{dsi}^m|^2 = 2Z_1 Z_2 i_{dsi}^{e*2} \sin(2\Delta\theta)$$

FIG. 10 illustrates a high frequency generator and magnetic flux regulator 810 in FIG. 8. The high frequency generator and magnetic flux regulator 810 (FIG. 8) outputs a high frequency signal $i_{si}^{e*}$ 965 to be superposed on an estimated magnetic flux axis, a magnetic flux command regulation value $\lambda_{rc}^\wedge$ 971 for regulating the magnitude of a magnetic flux in order to obtain the magnetic saliency of the physical quantity of an electric motor in such a manner that a magnetic flux position can be detected on a load condition, and a regulation gain Kci 981 for regulating a magnetic flux position on which a high frequency is to be superposed.

In some cases in which a sensorless control is to be carried out by means of a permanent magnet synchronous motor, subsequently, a reverse rotation is generated depending on a starting method. An initial magnetic pole position is to be estimated in a stoppage state before starting. A large number of conventional methods utilize the saturation characteristic of a core magnetic flux. In the invention, a high frequency is superposed and a signal related to the physical quantity of the motor in the superposed frequency component is utilized. An N magnetic pole position can be estimated by a change in the physical quantity of the motor based on a hysteresis in the magnetic saturation of the core magnetic flux and the position of a rotor.

If a high frequency is superposed on an estimated magnetic flux axis (d axis), it is distorted by the influence of the hysteresis. The cycle of a distorted waveform generates a frequency which is even-numbered times as high as the superposed frequency. In the case in which a voltage is superposed, the phenomenon appears on a current. In the case in which the current is superposed, the phenomenon appears on the voltage. Herein, an explanation will be given to an example in which an initial magnetic pole is estimated by using a high frequency which is a double of the superposed frequency.

FIG. 11 shows the characteristic of a high frequency current to be the double frequency of the superposed frequency (which will be hereinafter referred to as a double harmonic) in the case in which a voltage high frequency is superposed. In FIG. 11, an 'A' region indicates the track of the double harmonic obtained when a high frequency signal is superposed in the direction of the N pole of a magnet, that is, the direction of the d axis, and a 'B' region indicates the track of a double harmonic obtained when the high frequency signal is superposed in the direction of the S pole of the magnet, that is, the direction of a −d axis. At this time, the double harmonic can be detected in the following manner.

$$i_{dsh}^r = BPF(i_{ds}^r)$$

$$I_{d\sin 2\omega_h} = 2LPF(i_{dsh}^r \cdot \sin 2\omega_h t)$$

$$I_{d\cos 2\omega_h} = 2LPF(i_{dsh}^r \cdot \cos 2\omega_h t)$$

$$\phi = \tan^{-1} \frac{I_{d\sin 2\omega_h}}{I_{d\cos 2\omega_h}}$$

wherein $i_{ds}^r$:

a d-axis component of a primary current in a rotary coordinate system (a coordinate system rotating synchronously with a magnetic flux), $i_{dsh}^r$:

a double harmonic component current of a superposing signal,

BPF: a band-pass filter for extracting the double harmonic of the superposing signal, $I_{d\ sin\ 2\omega h}$: an amplitude of the reactive component of the double harmonic of the superposing signal, $I_{d\ cos\ 2\omega h}$: an amplitude of the effective component of the double harmonic of the superposing signal, LPF: a low-pass filter for removing a high frequency component ϕ: a phase angle of the double harmonic of the superposing signal.

As shown in FIG. 11, the phase angle of the double harmonic of the superposing signal represents the direction of a +d axis in the case in which it is positioned at ϕ [radian] and ϕ+π [radian], and represents the direction of the −d axis in the other cases. Accordingly, it is possible to discriminate the N and S poles of an initial magnetic pole.

FIG. 12 shows a method for estimating an initial magnetic pole position according to the invention. By the estimation of a magnetic flux position through a high frequency superposition before starting, an initial magnetic flux position is estimated. At the same time, the initial magnetic pole position is estimated by utilizing the characteristic of the double harmonic component of the superposed frequency. The estimation of the magnetic pole position can be calculated in a signal processing to be one step in the following manner.

$$I_{d\sin 2\omega h\phi} = 2 \cdot LPF(BPF(I_{ds}^r) \cdot \sin(2\omega_h t + \phi))$$

If Ld sin 2ωhϕ is positive, the N pole and the d axis are coincident with each other. To the contrary, if the Ld sin 2ωhϕ is negative, the N pole is provided in a reverse direction to the d axis. Accordingly, if the Ld sin 2ωhφ is negative, the N pole and the d axis are caused to be coincident with each other by adding π to a magnetic flux position estimated in an initial state. A time (TIME) required for correcting the polarity of the magnetic flux position can be set optionally. If the d axis and the N pole are once coincident with each other, the method for estimating a magnetic flux position through a high frequency superposition rarely misses the magnetic pole position in a low-speed driving operation.

The embodiment has described the basic features of the invention. While partial improvements and the replacement of functions can be made, the appended claims include all of the improvements and the replacement of the functions in a basic concept.

Next, a third embodiment according to the invention will be described with reference to the drawings.

Figure 13:
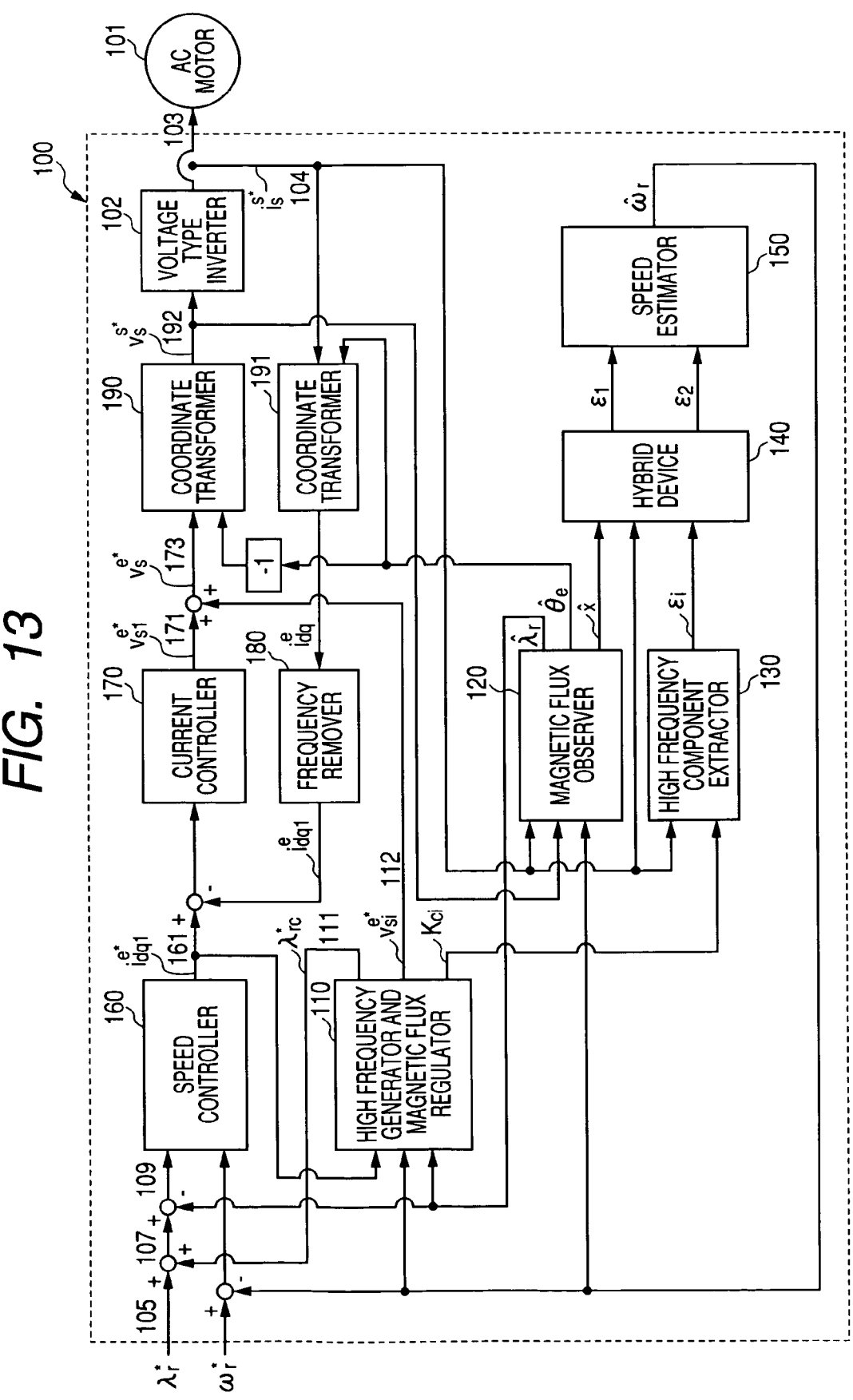
FIG. 13 is a diagram showing the structure of a sensorless control apparatus of an AC motor according to a third embodiment of the invention.

FIG. 13 is a diagram showing the structure of a sensorless control apparatus of an AC motor according to the third embodiment of the invention.

Figure 14:
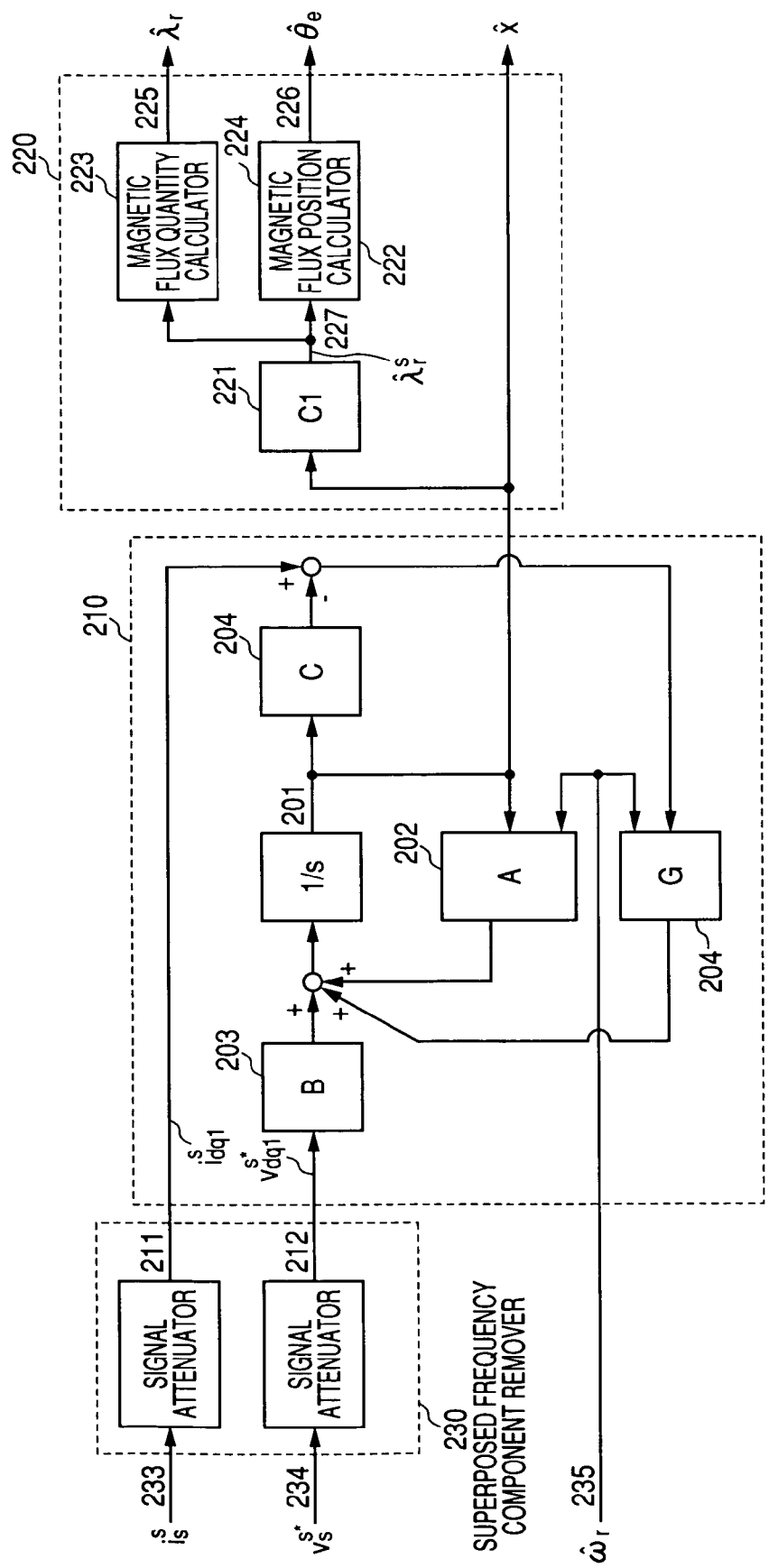
FIG. 14 is a diagram showing the details of a magnetic flux observer illustrated in FIG. 13.

FIG. 14 is a diagram showing the details of a magnetic flux observer illustrated in FIG. 13.

Figure 15:
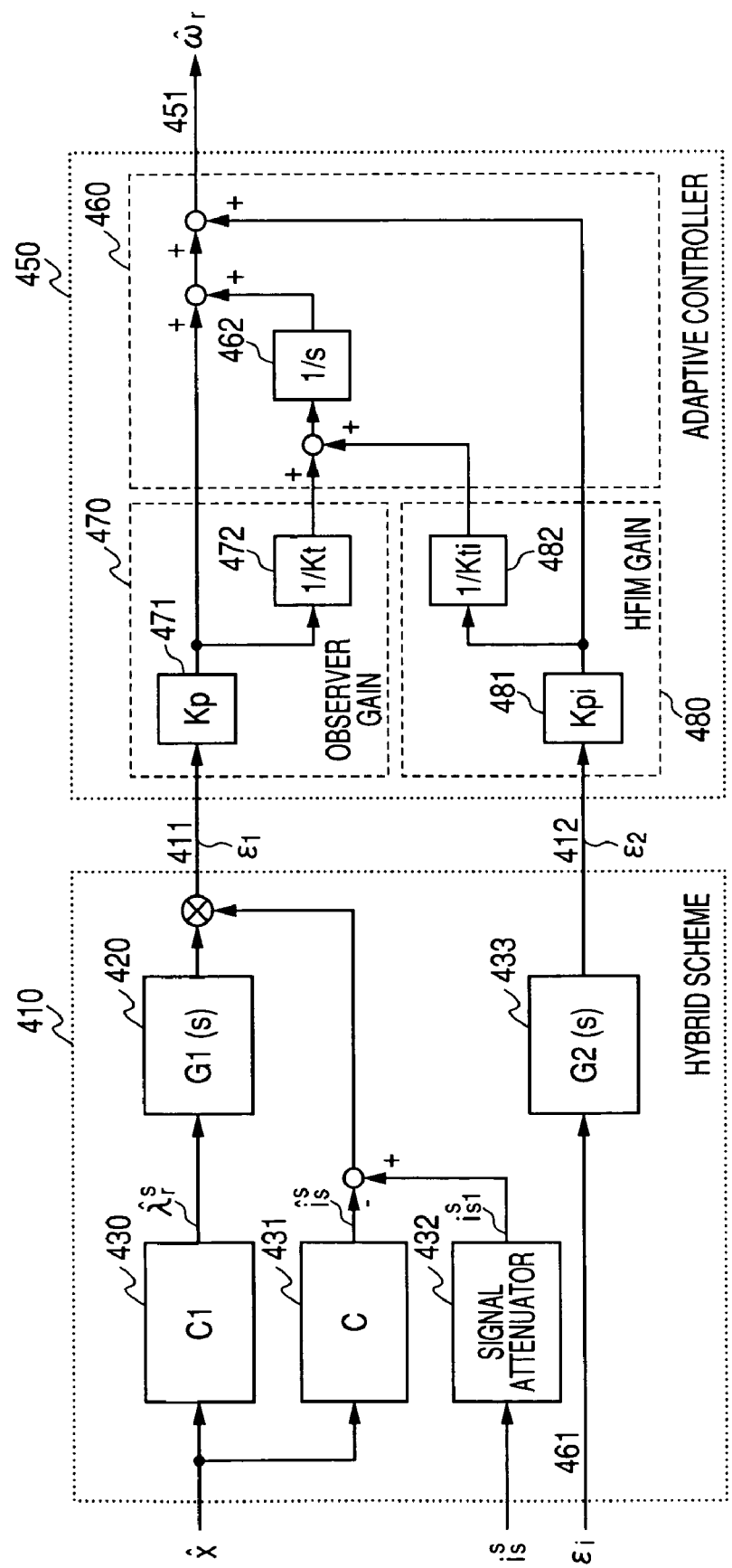
FIG. 15 is a diagram showing the details of a hybrid device and a speed estimator illustrated in FIG. 13.

FIG. 15 is a diagram showing the details of a hybrid device and a speed estimator illustrated in FIG. 13.

Figure 16:
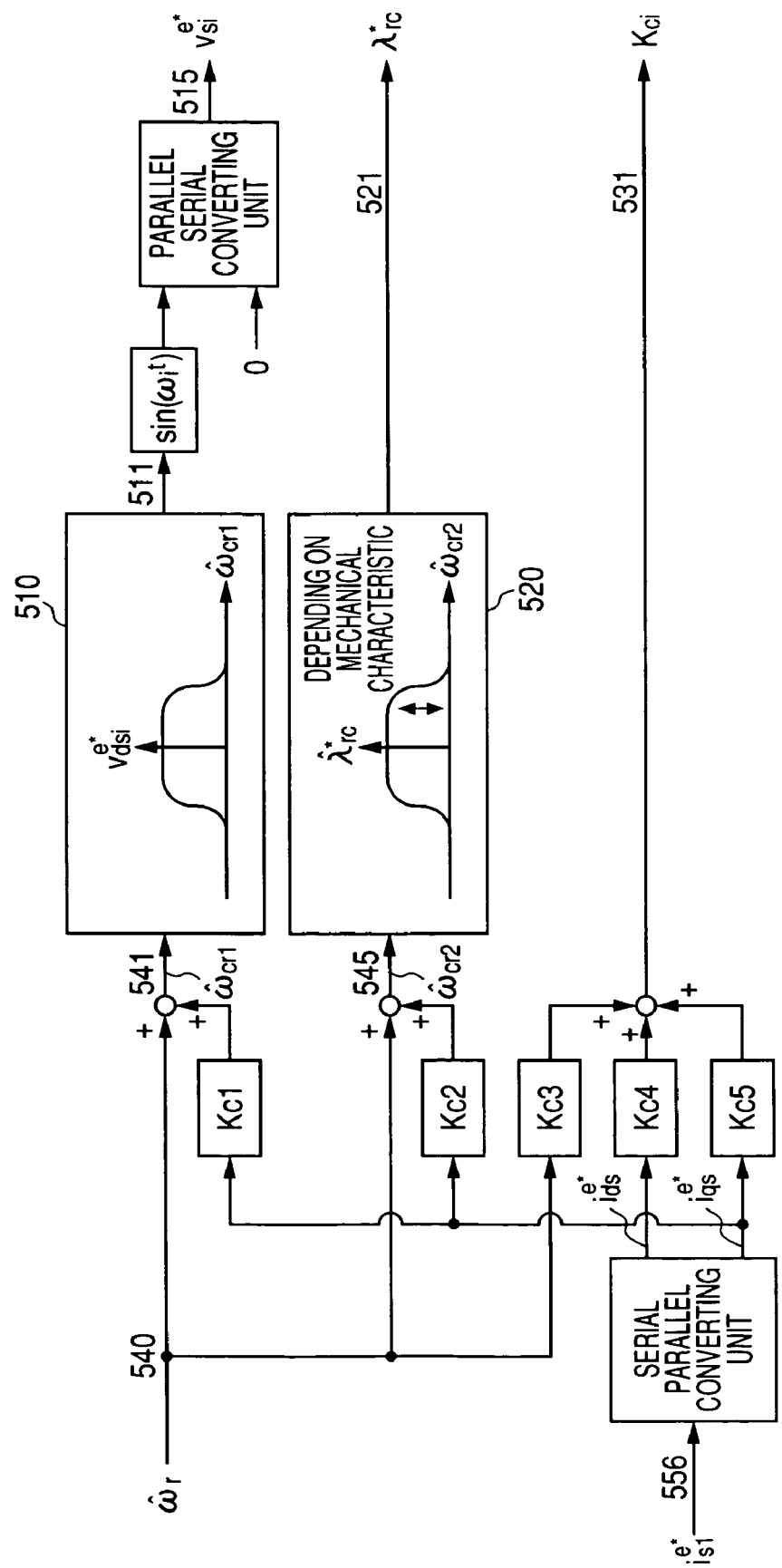
FIG. 16 is a diagram showing the details of a high frequency generator and a magnetic flux regulator illustrated in FIG. 13.

FIG. 16 is a diagram showing the details of a high frequency generator and magnetic flux regulator illustrated in FIG. 13.

While the example of the AC motor (synchronous motor) has been described in the above embodiments, an induction motor will be described in the embodiment. A control block shown in FIG. 13 can be implemented through a digital operation in order to drive an AC motor (induction motor) 101 in the same manner as in FIG. 1 by using a voltage type inverter 102. Moreover, the same control block can also be implemented by using an analog circuit or using the analog circuit and a digital circuit together.

In FIG. 13, in the same manner as the structure in FIG. 1, a sensorless control apparatus 100 has a high frequency generator and magnetic flux regulator 110 and the high frequency generator serves to superpose a high frequency signal on the estimated magnetic flux axis of an electric motor. The magnetic flux regulator regulates the magnetic saliency of the physical quantity of the electric motor in a high frequency region and regulates a magnetic flux command in order to compensate for a magnetic flux estimation error. Moreover, the error of a magnetic flux position which is made by a load is regulated in a magnetic flux position in which a high frequency is to be superposed.

A magnetic flux observer 120 estimates the magnitude and position of a magnetic flux from an electric motor input voltage, a detection current and a speed estimation value. A frequency component extractor 130 extracts, from a voltage or current detection signal having the same frequency component as the frequency component of a high frequency signal, an error signal of a magnetic flux position obtained based on the magnetic saliency of the physical quantity of an electric motor in a high frequency region generated by a magnetic saturation caused by a main magnetic flux or a skin effect produced by a high frequency. A hybrid device 140 serves to switch an adaptive regulator for adaptively regulating the error signal of the magnetic flux position to be the output of a high frequency component extractor and an adaptive regulator for adaptively regulating an error signal calculated from a magnetic flux estimation value and the error value of the output of the magnetic flux observer in the same observer from a low speed to a high speed depending on the speed without a shock.

A speed estimator 150 serves to adaptively estimate a speed in order to set, to be zero, the error signal to be the output value of the hybrid device. Moreover, the sensorless control apparatus has a magnetic flux and speed controller 160 and a current controller 170. There is required a superposed frequency remover 180 for removing a superposed frequency component from a current fed back to the current controller 170. The device 180 for removing the superposed frequency component is constituted by a low-pass filter or a notch filter. Consequently, a voltage command value 171 to be the output of the current controller 170 does not include a superposed frequency component. By using the estimated magnetic flux position, coordinate transformers 190 and 191 serve to execute a vector coordinate transformation as in the following equations (1) and (2), respectively.

$$V_s^{s*} = e^{j\theta e} V_s^{e*} \tag{1}$$

$$V_s^{e*} = e^{-j\theta e} V_s^{s*} \tag{2}$$

wherein $V_s^{s*}$ represents a voltage command vector in a static coordinate system (a U-phase reference of a phase voltage), and $V_s^{e*}$ represents a voltage command vector in a rotary coordinate system (which is rotated synchronously with an output frequency on an estimated magnetic flux axis reference).

In the embodiment shown in FIG. 13, thus, the induction motor 101 is controlled with the same structure and control method as that in the control block shown in FIG. 1, and the embodiment is different from FIG. 1 in that the rotor position estimator 135 and the initial magnetic pole position estimator 136 are deleted.

FIG. 14 shows the internal structure of the magnetic flux observer 120 in FIG. 13. The formula model of the induction motor in a static coordinate system can be expressed in the following manner.

$$\dot{x} = A(\omega_r)x + Bu \tag{7}$$

$$i_s^s = Cx \tag{4}$$

In the equations (7) and (4), $$x = [i_{ds}^s \ i_{qs}^s \ \lambda_{dr}^s \ \lambda_{qr}^s]^T,$$

$$A(\omega_r) = \begin{bmatrix} A_{11} & A(\omega_1)12 \\ A_{21} & A(\omega_r)11 \end{bmatrix},$$

$$B = \begin{bmatrix} 1/(\sigma L_s)I \\ 0 \end{bmatrix},$$

$$u = v_s^S = [v_{ds}^s \ v_{qs}^s]^T,$$

$$\lambda_r = [\lambda_{dr}^s \ \lambda_{qr}^s]^T,$$

and a system matrix (expressed in A), an output matrix (expressed in C) and matrices I and j are as follows, respectively.

$$A_{11} = -\{Rs/(\sigma L_s) + (1-\sigma)/(\sigma \tau_r)\}I,$$

$$A(\omega_r)_{12} = L_m/(\sigma L_s L_r)\{(1/\tau_r)I - \omega_r J\},$$

$$A_{21} = (L_m/\tau_r)I,$$

$$A(\omega_r)_{22} = -(1/\tau_r)I + \omega_r J,$$

$$C = [I0],$$

$$I = \begin{bmatrix} 1 & 0 \\ 0 & 1 \end{bmatrix}, \quad j = \begin{bmatrix} 0 & -1 \\ 1 & 0 \end{bmatrix},$$

A state variable is as follows.

$i_{ds}{}^s$=a d-axis component of a primary current in a static coordinate system, $i_{qs}{}^s$=a q-axis component of the primary current in the static coordinate system, $\lambda_{dr}{}^s$=a d-axis component of a secondary magnetic flux in the static coordinate system, $\lambda_{qr}{}^s$=a q-axis component of the secondary magnetic flux in the static coordinate system, $v_{ds}{}^s$=ad-axis component of a primary voltage in the static coordinate, and $v_{qs}{}^s$=a q-axis component of the primary voltage in the static coordinate system, $\omega_r$=rotor speed.

An observer 210 for the equations (7) and (4) is constituted in the following manner.

$$\dot{\hat{x}} = A\hat{x} + Bv_s{}^s + G(\hat{i}_s{}^s - i_s{}^s),$$

$$\hat{i}_s{}^s = C\hat{x},$$

$$\hat{\lambda}_r{}^s = C_1\hat{x},$$

wherein the state variables are as follows.

$$\hat{x} = \begin{bmatrix} \hat{i}_s^s & \hat{\lambda}_r^s \end{bmatrix}^T,$$

$$\hat{i}_s^s = \begin{bmatrix} \hat{i}_{ds}^s & \hat{i}_{qs}^s \end{bmatrix}^T,$$

$$\hat{\lambda}_r^s = \begin{bmatrix} \hat{\lambda}_{dr}^s & \hat{\lambda}_{qr}^s \end{bmatrix}^T,$$

Other matrices are as follows:

$C_1$=[0 1]; and

G=observer gain matrix.

In the state observer 210, a superposed frequency is removed and output from a feedback signal 233 and an input signal 234 by means of a superposed frequency component remover 230. This is required for removing the influence of a high frequency superposing signal. An estimated magnetic flux 227 is converted into a magnetic flux quantity 225 and a phase angle 226 by means of a magnetic flux quantity calculator 223 and a magnetic flux position calculator 224.

In FIG. 14, the output of an initial magnetic flux estimator is omitted.

Referring to the explanation of the high frequency component extractor 130 in FIG. 13, next, a structure is the same and description will be therefore given by sharing FIG. 3 in the above embodiment. The high frequency component extractor 130 serves to extract, from a voltage or current detection signal having the same frequency component as the frequency component of the superposed high frequency signal, the error signal of a magnetic flux position obtained based on the magnetic saliency of the physical quantity of an electric motor in a high frequency region generated by a magnetic saturation caused by a main magnetic flux or a skin effect produced by a high frequency.

Herein, the same error signal is extracted from the current detection signal. The high frequency component extractor is constituted by a superposed frequency component extracting unit 310 for extracting a superposed high frequency component from a detection voltage or current and a magnetic flux position error signal calculating unit 320 for calculating the error signal of a magnetic flux position.

In the case in which an estimated magnetic flux position 301 is not coincident with a true value, a high frequency current is generated on a q axis with a high frequency voltage superposed on a d axis of a rotary coordinate system. In order to estimate the magnetic flux position, accordingly, the high frequency signal is superposed on the estimated magnetic flux position 301. In the starting of the electric motor, an optional axis is assumed to be the estimated magnetic flux position 301. In order to detect the influence of the superposed high frequency, an orthogonal detection coordinate system 302 is put. The coordinate system is put in a π/4 radian lag phase from the estimated magnetic flux position 301. If the estimated magnetic flux position 301 is placed between an actual magnetic flux axis and an axial which is orthogonal thereto, a high frequency component detected by the detection coordinate system 302 has the magnetic saliency of a high frequency impedance. For this reason, a difference is made on a value over the reference axis (d axis) of the detection coordinate and the axis (q axis) which is orthogonal thereto. If it is assumed that an admittance at the superposed frequency is distributed in a bending shape and is symmetrical with respect to the actual magnetic flux axis, the magnitude of an admittance with a superposed frequency at an optional phase angle can be expressed in the following manner.

$$Y(\Delta\theta) = -Y_1 \cos(2\Delta\theta) + Y_2$$

$$\Delta\theta = \hat{\theta}_e - \theta_e$$

wherein $\hat{\theta}$ represents an estimated magnetic flux position and $\theta_e$ represents an actual magnetic flux position.

If a high frequency voltage having a frequency ωi and an amplitude Vdsi* is superposed on an estimated magnetic flux axis, a relationship between a voltage and a current in the detection coordinate system 302 can be expressed in the following manner.

$$|i_{dsi}^m| = \left[-Y_1 \cos\left(2\Delta\theta - \frac{\pi}{2}\right) + Y_2\right] \frac{v_{dsi}^*}{\sqrt{2}}$$

$$|i_{qsi}^m| = \left[-Y_1 \cos\left(2\Delta\theta + \frac{\pi}{2}\right) + Y_2\right] \frac{v_{qsi}^*}{\sqrt{2}}$$

wherein $i_{dsi}^m$ represents the superposed frequency component of a d-axis current in the detection coordinate system and $i_{qsi}^m$ represents the superposed frequency component of a q-axis current in the detection coordinate system.

In the invention, a primary current 303 is converted into the detection coordinate system by means of a coordinate converter 311. Only the superposed frequency component of a current 305 obtained by the conversion is extracted by means of a band-pass filter 312. Square values 333 and 334 of the amplitude of a current signal 306 thus extracted are calculated in the amplitude calculators 321 and 322. An error signal corresponding to a difference between values on the q axis and the d axis of the square value of an admittance in the detection coordinate system is defined in the following manner.

$$\varepsilon_{i0} = |i_{qsi}^m|^2 - |i_{dsi}^m|^2 = 2Y_1 Y_2 v_{dsi}^{*2} \sin(2\Delta\theta) \quad (5)$$

The error signal is corrected through an output Kci 337 of a compensator in the following manner in order to compensate for an estimated error or to maintain a magnetic saliency.

$$\epsilon_i = \epsilon_{i0} - K_{ci} \quad (6)$$

The Kci 337 will be described with reference to the following FIG. 16.

FIG. 15 illustrates the hybrid device 140 (410 in FIG. 15) and the speed estimator 150 (450 in FIG. 15) in FIG. 13. An error signal $\epsilon_1$ corresponding to a speed estimation error is constituted by a state estimation quantity through an observer in the following manner.

$$\epsilon_1 = (i_{ds}^s - \hat{i}_{ds}^s) \cdot G_1(s) \lambda_{qr}^s - G_2(s)(i_{qs}^s - \hat{i}_{qs}^s) \cdot G_1(s) \lambda_{dr}^s$$

wherein $G_1(s)$ represents a transfer function for removing an input signal in a region having a zero speed and a zero frequency.

In middle and high speed regions, accurate information about a magnetic flux position cannot be obtained, due to a voltage limitation, from an error signal $\epsilon_i$ 412 calculated in the equations (5) and (6). For this reason, a signal is to be removed depending on a speed. Therefore, an error signal $\epsilon_2$ is newly generated from the error signal $\epsilon_i$ 412 calculated in the equation (6) by using a transfer function of $G_2(s)$ 433.

$$\epsilon_2 = G_2(s)\epsilon_i$$

wherein $G_2(s)$ represents a transfer function for removing an input signal in middle and high speed regions.

The speed estimator 450 has a proportional integration (PI) regulator 460 and the gain of an error signal $\epsilon_1$ 411 is regulated to set an error signal $\epsilon_2$ 412 to be zero. The responsiveness of the error signal $\epsilon_1$ 411 and the error signal $\epsilon_2$ 412 and the regulated gain are different from each other. For this reason, the regulation can be separately carried out as in a gain 470 corresponding to the error signal $\epsilon_1$ (an error signal on an observer side) and a gain 480 corresponding to the error signal $\epsilon_2$ 412 (an error signal based on a high frequency superposition). The PI regulator 460 regulates the error signals to be zero, and at the same time, estimates a speed 451.

FIG. 16 illustrates the high frequency generator and magnetic flux regulator 110 in FIG. 13. The high frequency generator and magnetic flux regulator 110 outputs a high frequency signal $v_{si}^{e*}$ 515 to be superposed on an estimated magnetic flux axis, a magnetic flux command regulation value $\lambda rc*$ 521 for regulating the magnitude of a magnetic flux in order to obtain the magnetic saliency of the physical quantity of an electric motor in such a manner that a magnetic flux position can be detected on a load condition, and a regulation gain Kci 531 for regulating a magnetic flux position on which a high frequency is to be superposed.

An amplitude 511 of a high frequency signal is determined by a previously mapped table 510 on a condition 541 obtained in the following equation.

$$\hat{\omega}_{rc1} = \hat{\omega}_r + K_{c1} \cdot i_{qs}^{e*}$$

The magnetic flux command regulation value $\lambda rc*$ 521 is determined by a previously mapped table 520. The maximum value of a magnetic flux command regulation level is equivalent to a condition that the magnetic saliency of the physical quantity of an electric motor is maximized, and is based on a characteristic which is peculiar to the electric motor. The condition of the regulation is set to be a condition 545 which is determined in the following equation.

$$\hat{\omega}_{rc2} = \hat{\omega}_r + K_{c2} \cdot i_{qs}^{e*}$$

A method for detecting a magnetic flux position through a high frequency superposition is based on the characteristic of an impedance or admittance of the high frequency region of an induction motor. A condition that the saliency of the impedance of the high frequency region makes a loss will be described with reference to FIGS. 6 and 7 according to the above embodiment. FIG. 6 shows that an angle indicative of the degree of the saliency of the impedance is also delayed in a phase based on the inductance characteristic in the induction motor when an operation frequency is increased. FIG. 7 shows that the angle indicative of the degree of the saliency of the impedance is also delayed in the phase due to the saturation of the primary leakage inductance in the induction motor when a load is increased (a q-axis current is increased). The regulation gain Kci 531 for correcting an angle error made by the phenomenon is determined in the following equation.

$$K_{ci} = K_{c3} \cdot \hat{\omega}_r + K_{c4} \cdot i_{ds}^{e*} + K_{c5} \cdot i_{qs}^{e*}$$

Next, a fourth embodiment according to the invention will be described with reference to the drawings.

Figure 17:
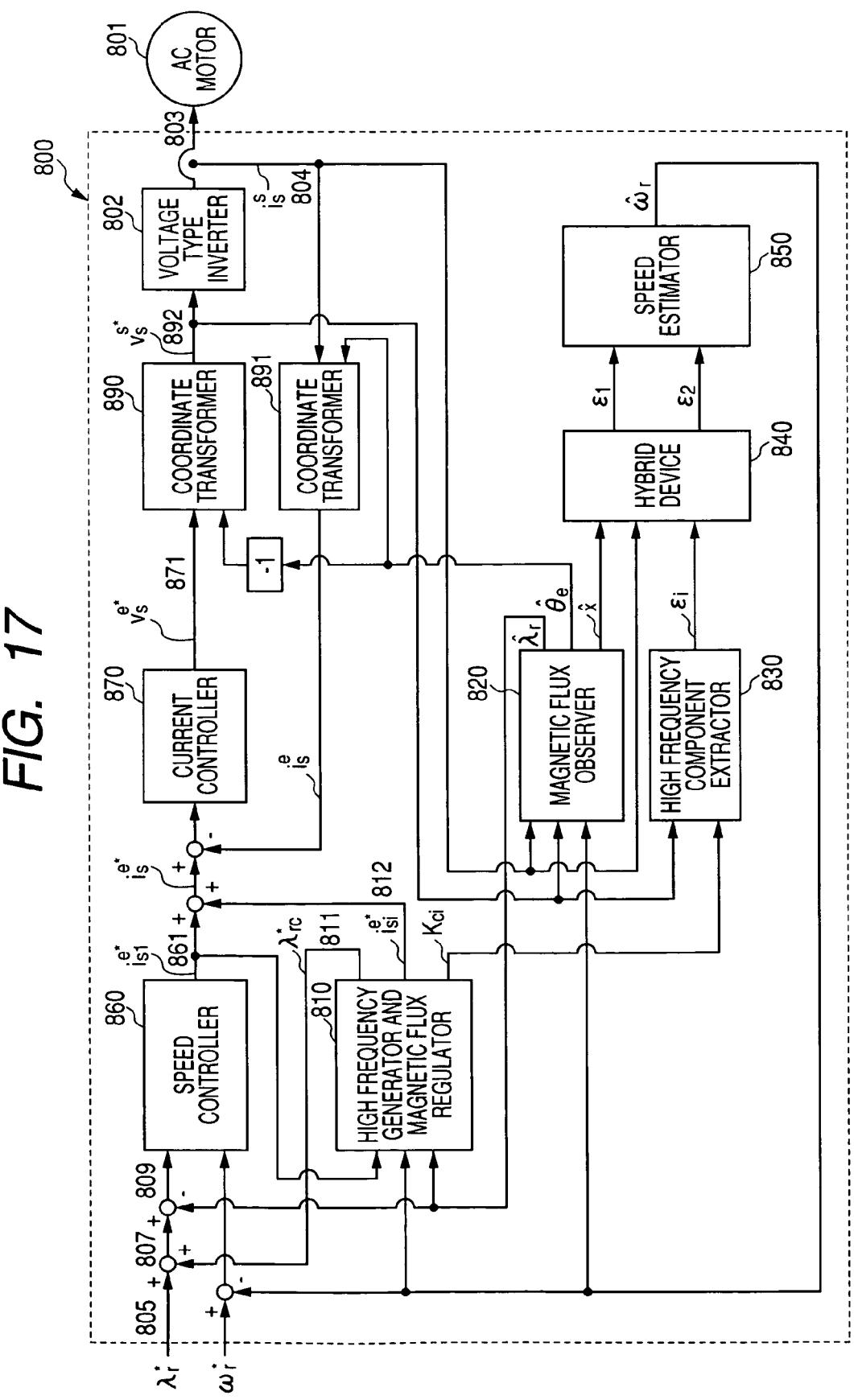
FIG. 17 is a diagram showing the structure of a sensorless control apparatus of an AC motor according to a fourth embodiment of the invention.

FIG. 17 is a diagram showing the structure of a sensorless control apparatus of an AC motor according to the fourth embodiment of the invention.

Figure 18:
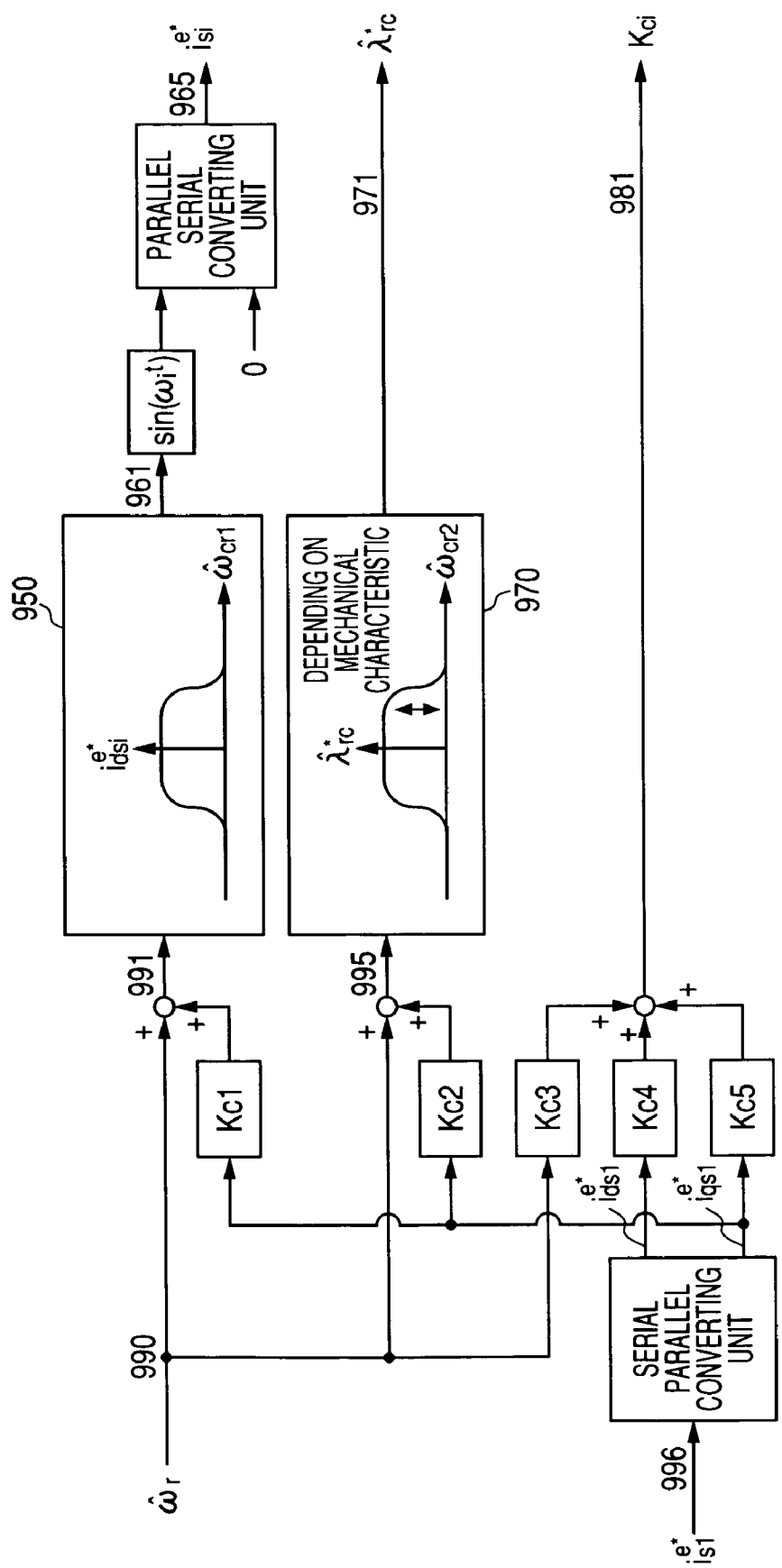
FIG. 18 is a diagram showing the details of a high frequency generator and a magnetic flux regulator illustrated in FIG. 17.

FIG. 18 is a diagram showing the details of a high frequency generator and magnetic flux regulator illustrated in FIG. 17.

FIG. 17 shows a method for superposing a high frequency current as the fourth embodiment. While the method is similar to the method for superposing a high frequency voltage in FIG. 13, it is different therefrom in that a high frequency signal 812 is superposed on the input portion of a current controller 870 and a superposing signal remover is erased from a detection current feedback portion.

Since the diagram showing the details of a high frequency component extractor 830 in FIG. 17 is the same as that of FIG. 9 according to the second embodiment, description will be given with reference to FIG. 9. Assuming that an impedance is distributed in a bending shape at a superposed frequency and is symmetrically with respect to an actual magnetic flux axis, an impedance with a superposed frequency at an optional phase angle can be expressed in the following manner.

$$Z(\Delta\theta) = Z_1 \cos(2\Delta\theta) + Z_2$$

If a high frequency current having a frequency $\omega i$ and an amplitude $i_{dsi}^{e*}$ is superposed on an estimated magnetic flux axis, a relationship between a voltage and a current in a detection coordinate system 902 can be expressed in the following manner.

$$|v_{dsi}^m| = \left[Z_1\cos(2\Delta\theta - \frac{\pi}{2}) + Z_2\right]\frac{i_{dsi}^{e*}}{\sqrt{2}}$$

$$|v_{qsi}^m| = \left[Z_1\cos(2\Delta\theta + \frac{\pi}{2}) + Z_2\right]\frac{i_{qsi}^{e*}}{\sqrt{2}}$$

wherein $v_{dsi}^m$ represents the superposed frequency component of a d-axis voltage in the detection coordinate system and $v_{qsi}^m$ represents the superposed frequency component of a q-axis voltage in the detection coordinate system.

In the invention, a primary voltage 903 is converted into the detection coordinate system by means of a coordinate converter 911. Only the superposed frequency component of a voltage 905 obtained by the conversion is extracted by means of a band-pass filter 912. Square values 933 and 934 of the amplitude of a voltage signal 906 thus extracted are calculated in amplitude calculators 921 and 922. An error signal corresponding to a difference between values on the q axis and the d axis of the square value of an impedance in the detection coordinate system is defined in the following manner.

$$\varepsilon_{i0} = |v_{qsi}^m|^2 - |v_{dsi}^m|^2 = 2Z_1Z_2 i_{dsi}^{e*2}\sin(2\Delta\theta)$$

FIG. 18 illustrates a high frequency generator and magnetic flux regulator 810 in FIG. 17. The high frequency generator and magnetic flux regulator 810 outputs a high frequency signal $i_{si}^{e*}$ 965 to be superposed on an estimated magnetic flux axis, a magnetic flux command regulation value $\lambda_{rc}{}^\wedge$ 971 for regulating the magnitude of a magnetic flux in order to obtain the magnetic saliency of the physical quantity of an electric motor in such a manner that a magnetic flux position can be detected on a load condition, and a regulation gain Kci 981 for regulating a magnetic flux position on which a high frequency is to be superposed.

The above embodiments have described the basic features of the invention. While partial improvements and the replacement of functions can be made, the invention includes all of the improvements and the replacement of the functions in a basic concept in the appended claims.

While the invention has been described in detail with reference to the specific embodiments, it is apparent to the skilled in the art that various changes and modifications can be made without departing from the spirit and scope of the invention.

The application is based on Japanese Patent Application (JP-A-2002-100259) filed on Apr. 2, 2002 and the contents thereof are incorporated by reference.

INDUSTRIAL APPLICABILITY

As described above, according to the invention, it is possible to produce such an advantage as to provide a sensorless control method and apparatus of an AC motor to implement stable torque and speed controls within all driving ranges including a region having a zero speed and a zero output frequency without generating a torque vibration element such as a voltage error or a noise even if a high frequency is superposed.

The invention claimed is:

1. A sensorless control apparatus of an AC motor which separates a motor current into a magnetic flux component and a torque component based on an estimated magnetic flux position of a synchronous motor without using position and speed sensors and independently controls the magnetic flux component and the torque component, thereby implementing a high control performance of the synchronous motor, comprising:

a high frequency generator for superposing a high frequency signal on an estimated magnetic flux axis of the motor;

a high frequency component extractor for extracting, from a voltage or current detection signal having the same frequency component as a frequency component of the high frequency signal, an error signal of the magnetic flux position which is obtained based on a magnetic saliency of a physical quantity of the motor in a high frequency region generated by a magnetic saturation caused by a main magnetic flux or a conductor skin effect produced by a high frequency;

a magnetic flux observer for estimating a magnitude and a position of a magnetic flux from a motor input voltage, a detection current and a speed estimation value;

a first adaptive regulator for adaptively regulating an error signal of a magnetic flux position to be an output of the high frequency component extractor;

a second adaptive regulator for adaptively regulating an error signal calculated from a magnetic flux estimation value and an error value of an output of the magnetic flux observer in a same observer;

a hybrid device for switching the first adaptive regulator at a very low speed, the first and second adaptive regulators at a low speed and the second adaptive regulator at a high speed; and a speed estimator for generating a speed estimation value from an output value of the hybrid device.

2. The sensorless control apparatus of an AC motor according to claim 1, further comprising a magnetic flux regulator for regulating a magnetic flux level, regulating a magnetic saliency of a physical quantity of the motor in a high frequency region and regulating an efficiency;

an estimated error corrector for correcting an estimated error made in an estimated magnetic flux, an estimated rotor speed and an estimated rotor position;

a magnetic flux position calculator for calculating a position of a magnetic flux from the magnetic flux estimated from the magnetic flux observer;

a current controller for separating a detection current into a magnetic flux direction component and a torque component by using an estimated magnetic flux position, feeding back the magnetic flux direction component and the torque component and comparing the magnetic flux direction component with a current command value of the torque component, thereby carrying out a current control;

a speed controller for comparing an estimated speed with a command speed to execute a speed control in such a maimer that a deviation thereof is set to be zero, thereby outputting a torque command value or a current command value corresponding to a torque command; and an initial magnetic pole position estimator for estimating an initial magnetic pole position before starting.

3. The sensorless control apparatus of an AC motor according to claim 1, wherein the high frequency generator includes a device for regulating a high frequency signal to be superposed depending on a rotating speed of a magnetic flux or a rotor speed.

4. The sensorless control apparatus of an AC motor according to claim 1, wherein the high frequency generator superposes a high frequency signal on a voltage command value.

5. The sensorless control apparatus of an AC motor according to claim 1, wherein the high frequency generator superposes a high frequency signal on a current command value.

6. The sensorless control apparatus of an AC motor according to claim 1, wherein the magnetic flux observer has a function of removing the high frequency signal from a motor input voltage depending on an output frequency or a speed.

7. The sensorless control apparatus of an AC motor according to claim 1, wherein an error signal of a magnetic flux position obtained in the high frequency component extractor is based on an impedance or an admittance in a high frequency region which is superposed.

8. The sensorless control apparatus of an AC motor according to claim 1, wherein the hybrid device has a function of removing an output of the second adaptive regulator in a very low speed region including a zero speed and has a function of removing an output of the first adaptive regulator in middle and high speed regions.

9. The sensorless control apparatus of an AC motor according to claim 1, wherein the speed estimator adaptively estimates a speed in order to set an error signal to be an output value of the hybrid device to be zero.

10. The sensorless control apparatus of an AC motor according to claim 2, wherein the magnetic flux regulator regulates a magnetic flux level into a portion in which a magnetic saliency of a physical quantity of the motor in a high frequency region can be maintained and a high efficiency can be obtained, and the estimated error corrector corrects an estimated magnetic flux, an estimated rotor speed and an estimated rotor position error which are generated when the magnetic saliency at the high frequency is reduced.

11. The sensorless control apparatus of an AC motor according to claim 2, wherein the current controller has a function of removing a superposed high frequency component from a current which is fed back when the high frequency signal to be superposed is a voltage and a response frequency of the controller is set to be higher than a superposed frequency component when the high frequency signal to be superposed is a current.

12. The sensorless control apparatus of an AC motor according to claim 2, wherein the initial magnetic pole position estimator has a signal processing portion for extracting at least one frequency of harmonics which are nth power of 2 (N=−1, 1, 2, 3, . . . , n) of the superposed high frequency and serves to discriminate an N or S pole of a magnetic pole.

13. A sensorless control method of an AC motor which separates a motor current into a magnetic flux component and a torque component based on an estimated magnetic flux position of a synchronous motor without using position and speed sensors and independently controls the magnetic flux component and the torque component, thereby implementing a high control performance of the synchronous motor, comprising:

means for superposing a high frequency signal on an estimated magnetic flux axis of the motor;

means for extracting an error signal of the magnetic position from a voltage or current detection signal having the same frequency component as a frequency component of the high frequency signal, the error signal being obtained based on a magnetic saliency of a physical quantity of the motor in a high frequency region generated by a magnetic saturation caused by a main magnetic flux or a conductor skin effect produced by a high frequency;

means for estimating a magnitude and a position of a magnetic flux from a motor input voltage, a detection current and a speed estimation value through a magnetic flux observer;

first adaptive rule means for adaptively regulating an error signal of a magnetic flux position to be an output of the high frequency component extractor;

second adaptive rule means for adaptively regulating an error signal calculated from a magnetic flux estimation value and an error value of an output of the magnetic flux observer in the same observer;

means for switching the first and second adaptive rule means depending on a speed; and means for estimating a speed from an output signal of the adaptive rule means.

14. The sensorless control method of an AC motor according to claim 13, further comprising means for regulating a magnetic flux in order to maintain a magnetic saliency of a physical quantity of the motor in a high frequency region and to hold a high efficiency;

an estimated error corrector for correcting an estimated error made in an estimated magnetic flux, an estimated rotor speed and an estimated rotor position;

means for calculating a position of a magnetic flux from a magnetic flux vector estimated from the magnetic flux observer;

means for separating a detection current into a magnetic flux direction component and a torque component by using an estimated magnetic flux position, feeding back the magnetic flux direction component and the torque component and comparing the magnetic flux direction component with a current command value of the torque component, thereby carrying out a current control;

means for comparing an estimated speed with a command speed to execute a speed control in such a manner that a deviation thereof is set to be zero, thereby outputting a torque command value or a current command value corresponding to a torque command; and initial magnetic pole estimating means for discriminating an N or S pole of a magnetic pole before starting.

15. The sensorless control method of an AC motor according to claim 13, wherein the means for switching the adaptive rule means depending on a speed has a function of removing an output signal of the second adaptive rule means in a very low speed region including a zero speed and a zero frequency and has a function of removing an output signal of the first adaptive rule means in middle and high speed regions.

16. The sensorless control method of an AC motor according to claim 13, wherein the means for extracting an error signal of a magnetic flux position obtained based on a magnetic saliency of a physical quantity of the motor uses the physical quantity of the motor including a motor input voltage command value and a detection current or a detection voltage and the detection current.

17. The sensorless control method of an AC motor according to claim 13, wherein the means for superposing a high frequency has means for regulating a high frequency signal to be superposed depending on an output frequency or a speed.

18. The sensorless control method of an AC motor according to claim 14, wherein the means for regulating a magnetic flux serves to regulate a magnitude of a magnetic flux in order to obtain a magnetic saliency of a physical quantity of the motor in such a manner that a magnetic flux position can be detected at a very low speed including a zero speed and a zero frequency and an error of a magnetic flux position which is made by a load is regulated in a magnetic flux position on which a high frequency is to be superposed, the regulating means carrying out a regulation through an estimated error and a stator (primary) current or a command current.

19. The sensorless control method of an AC motor according to claim 14, wherein the initial magnetic pole estimating means has a signal processing portion for extracting at least one frequency of harmonics which are nth power of 2 (N=−1, 1, 2, 3, . . . , n) of the superposed high frequency and serves to discriminate an N or S pole of a magnetic pole.

20. A sensorless control apparatus of an AC motor which separates a motor current into a magnetic flux component and a torque component based on an estimation value of a magnetic flux position of an induction motor without using a speed sensor and independently controls the magnetic flux component and the torque component, thereby implementing a high control performance of the induction motor, comprising:
- a high frequency generator for superposing a high frequency signal on an estimated magnetic flux axis of the motor;
- a high frequency component extractor for extracting, from a voltage or current detection signal having the same frequency component as a frequency component of the high frequency signal, an error signal of the magnetic flux position obtained based on a magnetic saliency of a physical quantity of the motor in a high frequency region generated by a magnetic saturation caused by a main magnetic flux or a conductor skin effect produced by a high frequency;
- a magnetic flux observer for estimating a magnitude and a position of a magnetic flux from a motor input voltage, a detection current and a speed estimation value;
- a third adaptive regulator for adaptively regulating an error signal of a magnetic flux position to be an output of the high frequency component extractor;
- a fourth adaptive regulator for adaptively regulating an error signal calculated from a magnetic flux estimation value and an error value of an output of the magnetic flux observer in a same observer;
- a hybrid device for switching the third adaptive regulator at a very low speed, the third and fourth adaptive regulators at a low speed and the fourth adaptive regulator at a high speed; and
- a speed estimator for generating a speed estimation value from an output value of the hybrid device.

21. The sensorless control apparatus of an AC motor according to claim 20, further comprising a magnetic flux regulator for regulating a magnetic flux command and a magnetic flux position on which a high frequency signal is to be superposed in order to adjust a magnetic saliency of a physical quantity of the motor in a high frequency region;
- a magnetic flux position calculator for calculating a position of a magnetic flux from the magnetic flux estimated from the magnetic flux observer;
- a current controller for separating a detection current into a magnetic flux direction component and a torque component by using the calculated magnetic flux position, feeding back the magnetic flux direction component and the torque component and comparing the magnetic flux direction component with a current command value of the torque component, thereby carrying out a current control; and
- a speed controller for comparing an estimated speed with a command speed to execute a speed control in such a manner that a deviation thereof is set to be zero, thereby outputting a torque command value or a current command value corresponding to a torque command.

22. The sensorless control apparatus of an AC motor according to claim 20, wherein the high frequency generator includes a device for regulating a high frequency signal to be superposed depending on an output frequency or a speed.

23. The sensorless control apparatus of an AC motor according to claim 20, wherein the high frequency generator superposes a high frequency signal on a voltage command value.

24. The sensorless control apparatus of an AC motor according to claim 20, wherein the high frequency generator superposes a high frequency signal on a current command value.

25. The sensorless control apparatus of an AC motor according to claim 20, wherein the magnetic flux observer has a function of removing the high frequency signal from a motor input voltage depending on an output frequency or a speed.

26. The sensorless control apparatus of an AC motor according to claim 20, wherein an error signal of a magnetic flux position obtained in the high frequency component extractor is based on an impedance or an admittance in a high frequency region which is superposed.

27. The sensorless control apparatus of an AC motor according to claim 20, wherein the hybrid device has a function of removing an output of the fourth adaptive regulator in a very low speed region including a zero speed and a zero frequency, and has a function of removing an output of the third adaptive regulator in middle and high speed regions.

28. The sensorless control apparatus of an AC motor according to claim 20, wherein the speed estimator adaptively estimates a speed in order to set an error signal to be an output value of the hybrid device to be zero.

29. The sensorless control apparatus of an AC motor according to claim 21, wherein the magnetic flux regulator has a function of regulating a magnitude of a magnetic flux in order to obtain a magnetic saliency of a physical quantity of the motor such that a magnetic flux position can be detected and a function of regulating an error of a magnetic flux position which is made by a load in a magnetic flux position on which a high frequency is to be superposed.

30. The sensorless control apparatus of an AC motor according to claim 21, wherein the current controller has a function of removing a superposed frequency component from a current fed back when the high frequency signal to be superposed is a voltage, and a response frequency of the controller is set to be higher than the superposed frequency component when the high frequency signal to be superposed is a current.

31. A sensorless control method of an AC motor which separates a motor current into a magnetic flux component and a torque component based on an estimation value of a magnetic flux position of an induction motor without using a speed sensor and independently controls the magnetic flux component and the torque component, thereby implementing a high control performance of the induction motor, comprising:

means for superposing a high frequency signal on an estimated magnetic flux axis of the motor;

means for extracting an error signal of the magnetic position from a voltage or current detection signal having the same frequency component as a frequency component of the high frequency signal, the error signal of the magnetic flux position being obtained based on a magnetic saliency of a physical quantity of the motor in a high frequency region generated by a magnetic saturation caused by a main magnetic flux or a conductor skin effect produced by a high frequency;

means for estimating a magnitude and a position of a magnetic flux from a motor input voltage, a detection current and an estimated speed through a magnetic flux observer;

third adaptive rule means for adaptively regulating an error signal of a magnetic flux position to be an output of the high frequency component extractor;

fourth adaptive rule means for adaptively regulating an error signal calculated from a magnetic flux estimation value and an error value of an output of the magnetic flux observer in a same observer;

means for switching the first and second adaptive rule means depending on a speed or an output frequency; and means for estimating a speed from an output signal of the adaptive rule means.

32. The sensorless control method of an AC motor according to claim 31, further comprising means for regulating a magnetic flux in order to adjust a magnetic saliency of a physical quantity of the motor in a high frequency region;

means for calculating a position of a magnetic flux from the magnetic flux estimated from the magnetic flux observer;

means for separating a detection current into a magnetic flux direction component and a torque component by using the calculated magnetic flux position, feeding back the magnetic flux direction component and the torque component and comparing the magnetic flux direction component with a current command value of the torque component, thereby carrying out a current control in such a maimer that each deviation is set to be zero; and means for comparing an estimated speed with a command speed to execute a speed control in such a manner that a deviation thereof is set to be zero, thereby outputting a torque command value or a current command value corresponding to a torque command.

33. The sensorless control method of an AC motor according to claim 31, wherein the means for switching the adaptive rule means has a function of removing an output signal of the fourth adaptive rule means in a very low speed region including a zero speed and a zero frequency and a function of removing an output signal of the third adaptive rule means in middle and high speed regions.

34. The sensorless control method of an AC motor according to claim 31, wherein the means for extracting an error signal of a magnetic flux position obtained based on a magnetic saliency of a physical quantity of the motor and the means for estimating a magnitude and a position of a magnetic flux by a magnetic flux observer use the physical quantity of the motor including a motor input voltage command value and a detection current or a detection voltage and the detection current.

35. The sensorless control method of an AC motor according to claim 31, wherein the means for superposing a high frequency has means for regulating a high frequency signal to be superposed depending on an output frequency or a speed.

36. The sensorless control method of an AC motor according to claim 32, wherein the regulating means serves to regulate a magnitude of a magnetic flux in order to obtain a magnetic saliency of a physical quantity of the motor such that a magnetic flux position can be detected at a very low speed including a zero speed and a zero frequency and an error of a magnetic flux position which is made by a load is regulated in a magnetic flux position on which a high frequency is to be superposed, the regulating means depending on an estimated speed and a stator (primary) current or a command current.

* * * * *